(12) United States Patent
Svendsen et al.

(10) Patent No.: US 12,057,918 B2
(45) Date of Patent: Aug. 6, 2024

(54) NON-LINE-OF-SIGHT PATH DETECTION FOR USER EQUIPMENT POSITIONING IN WIRELESS NETWORKS

(71) Applicant: Nokia Technologies Oy, Espoo (FI)

(72) Inventors: Simon Svendsen, Aalborg (DK); Nuno Manuel Kiilerich Pratas, Gistrup (DK); Johannes Harrebek, Aalborg (DK); Benny Vejlgaard, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 17 days.

(21) Appl. No.: 17/635,590

(22) PCT Filed: Aug. 16, 2019

(86) PCT No.: PCT/EP2019/072028
§ 371 (c)(1),
(2) Date: Feb. 15, 2022

(87) PCT Pub. No.: WO2021/032267
PCT Pub. Date: Feb. 25, 2021

(65) Prior Publication Data
US 2022/0271818 A1    Aug. 25, 2022

(51) Int. Cl.
*H04B 7/06*  (2006.01)
*H04B 7/08*  (2006.01)
(Continued)

(52) U.S. Cl.
CPC ......... *H04B 7/0695* (2013.01); *H04B 7/0626* (2013.01); *H04B 7/088* (2013.01);
(Continued)

(58) Field of Classification Search
CPC .... H04B 7/0695; H04B 7/088; H04B 7/0897; H04W 64/006
See application file for complete search history.

(56) References Cited

U.S. PATENT DOCUMENTS

| 2008/0009295 A1 | 1/2008 | Brousseau et al. ........ 455/456.1 |
| 2018/0041984 A1* | 2/2018 | Li .......................... H04W 8/08 |

(Continued)

OTHER PUBLICATIONS

R1-1906563, "Measurement and reporting design for NR positioning", 3GPP TSG RAN WG1 meeting #97, MediaTek, Reno, Nevada, USA, May 13-17, 2019 (Year: 2019).*

(Continued)

*Primary Examiner* — Aristocratis Fotakis
(74) *Attorney, Agent, or Firm* — Lippes Mathias LLP

(57) ABSTRACT

According to an example embodiment, a method may include receiving, by a user equipment from a serving base station, a location update request; selecting, by the user equipment, a plurality of base station transmit beams including a beam for the serving base station and a beam for each of one or more non-serving base stations; determining, by the user equipment, a beam direction of each beam of the plurality of base station transmit beams; determining angle information including an angle between beam directions of one or more pairs of beams of the plurality of base station transmit beams; and, sending, by the user equipment to the serving base station in response to the location update request, the angle information, and a beam identifier identifying the selected beam for each of the one or more non-serving base stations.

10 Claims, 12 Drawing Sheets

(51) Int. Cl.
H04W 56/00 (2009.01)
H04W 64/00 (2009.01)

(52) U.S. Cl.
CPC ........ H04B 7/0897 (2013.01); H04W 56/001 (2013.01); H04W 64/006 (2013.01)

(56) References Cited

U.S. PATENT DOCUMENTS

| | | | |
|---|---|---|---|
| 2019/0223140 A1* | 7/2019 | Grossmann | H04W 48/10 |
| 2019/0373575 A1* | 12/2019 | Kurras | G01S 5/10 |
| 2020/0107288 A1* | 4/2020 | Kumar | H04B 7/088 |
| 2020/0267508 A1* | 8/2020 | Fischer | H04W 4/029 |
| 2020/0367224 A1* | 11/2020 | Persson | H04B 7/0695 |
| 2021/0048502 A1* | 2/2021 | Gummadi | G01S 5/0218 |
| 2021/0051622 A1* | 2/2021 | Manolakos | H04W 24/10 |
| 2021/0250892 A1* | 8/2021 | Kim | H04L 5/0048 |
| 2021/0270932 A1* | 9/2021 | Bi | H04W 64/006 |
| 2021/0345289 A1* | 11/2021 | Priyanto | G01S 5/0036 |
| 2022/0311488 A1* | 9/2022 | Shreevastav | H04B 7/0408 |
| 2023/0135259 A1* | 5/2023 | Kurita | H04B 7/0695 |

OTHER PUBLICATIONS

Nokia et al., "DL based NR positioning," 3Gpp TSG RAN WG1 #96 R1-1901847, Feb. 25-Mar. 1, 2019.

* cited by examiner

NON-LINE-OF-SIGHT PATH DETECTION FOR USER EQUIPMENT POSITIONING IN WIRELESS NETWORKS

CROSS REFERENCE TO RELATED APPLICATION

This patent application is a U.S. National Stage application of International Patent Application Number PCT/EP2019/072028 filed Aug. 16, 2019, which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving, by a user equipment from a serving base station, a location update request; selecting, by the user equipment, a plurality of base station transmit beams including a beam for the serving base station and a beam for each of one or more non-serving base stations; determining, by the user equipment, a beam direction of each beam of the plurality of base station transmit beams; determining angle information including an angle between beam directions of one or more pairs of beams of the plurality of base station transmit beams; and sending, by the user equipment to the serving base station in response to the location update request, the angle information, and a beam identifier or time stamp identifying the selected beam for each of the one or more non-serving base stations.

According to an example embodiment, an apparatus may include means for receiving, by a user equipment from a serving base station, a location update request; means for selecting, by the user equipment, a plurality of base station transmit beams including a beam for the serving base station and a beam for each of one or more non-serving base stations; means for determining, by the user equipment, a beam direction of each beam of the plurality of base station transmit beams; means for determining angle information including an angle between beam directions of one or more pairs of beams of the plurality of base station transmit beams; and means for sending, by the user equipment to the serving base station in response to the location update request, the angle information, and a beam identifier or time stamp identifying the selected beam for each of the one or more non-serving base stations.

According to an example embodiment, an apparatus may include: at least one processor; and at least one memory including computer program code; the at least one memory and the computer program code configured to, with the at least one processor, cause the apparatus at least to: receive, by a user equipment from a serving base station, a location update request; select, by the user equipment, a plurality of base station transmit beams including a beam for the serving base station and a beam for each of one or more non-serving base stations; determine, by the user equipment, a beam direction of each beam of the plurality of base station transmit beams; determine angle information including an angle between beam directions of one or more pairs of beams of the plurality of base station transmit beams; and send, by the user equipment to the serving base station in response to the location update request, the angle information, and a beam identifier or time stamp identifying the selected beam for each of the one or more non-serving base stations.

According to an example embodiment, a non-transitory computer-readable storage medium comprising instructions stored thereon that, when executed by at least one processor, are configured to cause a computing system to perform a method of: receiving, by a user equipment from a serving base station, a location update request; selecting, by the user equipment, a plurality of base station transmit beams including a beam for the serving base station and a beam for each of one or more non-serving base stations; determining, by the user equipment, a beam direction of each beam of the plurality of base station transmit beams; determining angle information including an angle between beam directions of one or more pairs of beams of the plurality of base station transmit beams; and sending, by the user equipment to the serving base station in response to the location update request, the angle information, and a beam identifier or time stamp identifying the selected beam for each of the one or more non-serving base stations.

According to an example embodiment, a method may include receiving user equipment-calculated angle information including a user equipment-calculated angle between beam directions of one or more pairs of a plurality of user equipment-selected base station transmit beams, wherein the plurality of user equipment-selected base station transmit beams comprise a beam for a serving base station of the user equipment and a beam for each of one or more non-serving base stations; determining base station-based angle information including a base station-based angle between beam directions of one or more pairs of a plurality of the user equipment-selected base station transmit beams; and comparing the user equipment-calculated angle information with the base station-based angle information.

According to an example embodiment, an apparatus may include means for receiving user equipment-calculated angle information including a user equipment-calculated angle between beam directions of one or more pairs of a plurality of user equipment-selected base station transmit beams, wherein the plurality of user equipment-selected base station transmit beams comprise a beam for a serving base station of the user equipment and a beam for each of one or more non-serving base stations; means for determining base station-based angle information including a base station-based angle between beam directions of one or more pairs of a plurality of the user equipment-selected base station transmit beams; and means for comparing the user equipment-calculated angle information with the base station-based angle information.

According to an example embodiment, an apparatus may include: at least one processor; and at least one memory including computer program code; the at least one memory and the computer program code configured to, with the at least one processor, cause the apparatus at least to: receive user equipment-calculated angle information including a user equipment-calculated angle between beam directions of one or more pairs of a plurality of user equipment-selected base station transmit beams, wherein the plurality of user equipment-selected base station transmit beams comprise a beam for a serving base station of the user equipment and a beam for each of one or more non-serving base stations; determine base station-based angle information including a base station-based angle between beam directions of one or more pairs of a plurality of the user equipment-selected base station transmit beams; and compare the user equipment-calculated angle information with the base station-based angle information.

According to an example embodiment, a non-transitory computer-readable storage medium comprising instructions stored thereon that, when executed by at least one processor, are configured to cause a computing system to perform a method of: receiving user equipment-calculated angle information including a user equipment-calculated angle between beam directions of one or more pairs of a plurality of user equipment-selected base station transmit beams, wherein the plurality of user equipment-selected base station transmit beams comprise a beam for a serving base station of the user equipment and a beam for each of one or more non-serving base stations; determining base station-based angle information including a base station-based angle between beam directions of one or more pairs of a plurality of the user equipment-selected base station transmit beams; and comparing the user equipment-calculated angle information with the base station-based angle information.

The details of one or more examples of embodiments are set forth in the accompanying drawings and the description below. Other features will be apparent from the description and drawings, and from the claims.

DETAILED DESCRIPTION

Figure 1:
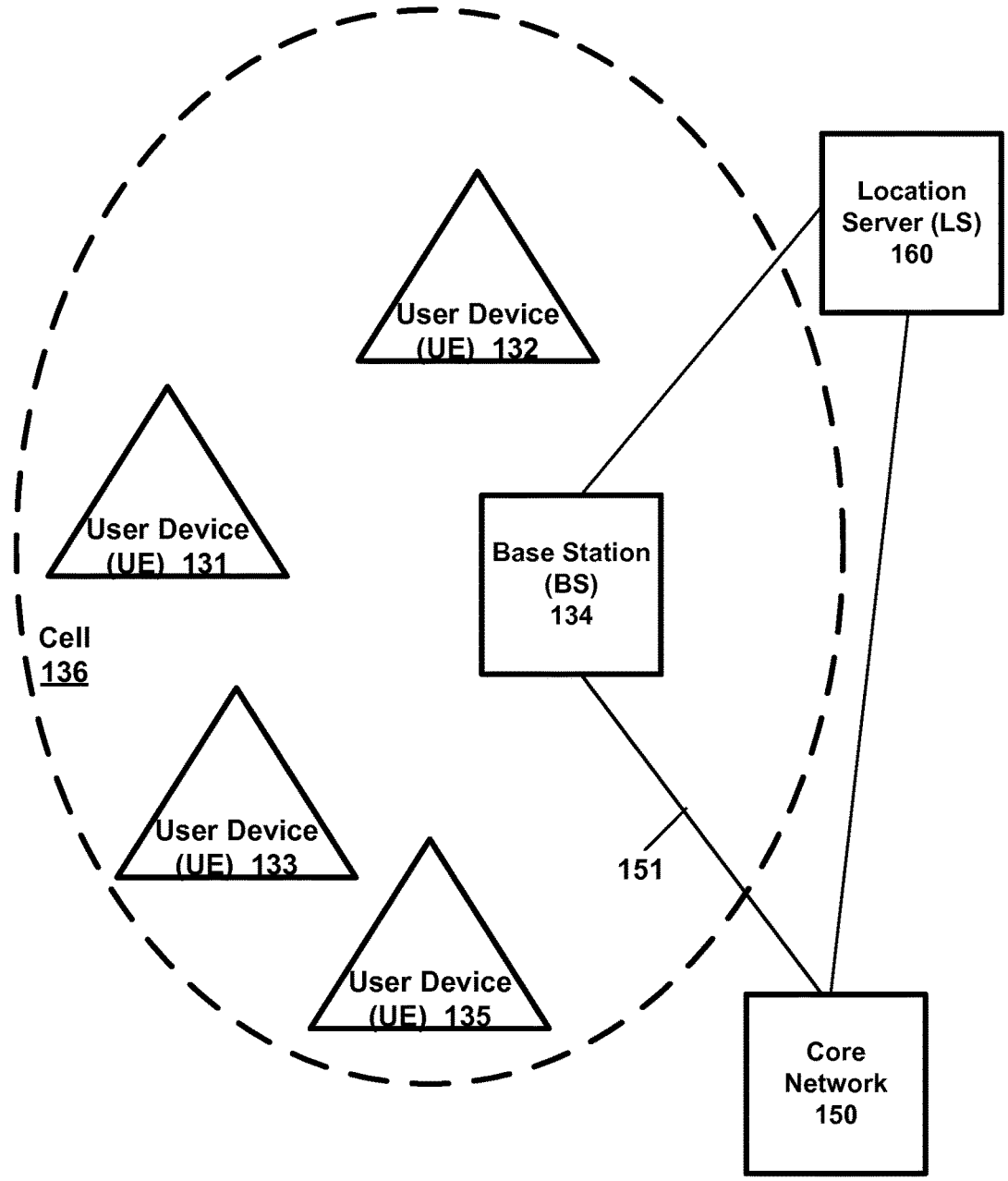
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a Si interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

The 5G New Radio (NR) may include features such as Cross Link Interference mitigation and Side-link communication where it may be necessary to know the locations of the UE's in the network, especially when operating at mmWave frequencies where directive antenna arrays are used at both the gNB and the UE. Obtaining an accurate estimation of a UE's position may be useful or even required in some cases for some types of applications, features or services within 5G (NR) or other wireless networks.

One straight forward way to obtain a UE's position may be for a UE to use satellite positioning, e.g., for a UE to have a satellite receiver to receive signals from multiple satellites, and then calculate its position based on these satellite signals. Some example satellites may be provided that are part of a Global Navigation Satellite System (GNSS), or other satellite system. However, many UE's for 5G NR may be incapable of using GNSS (or other satellites) due to a type of the UE (e.g., M2M/machine-to-machine UE or other type of UE) and/or the type of environment (indoor) where it is operating. Thus, satellite positioning may not be available for some types of UEs.

If a satellite based UE positioning is not available for a UE, then a location of a UE may be determined using one or more alternative positioning techniques that may be based on: e.g., triangulation or multilateration (which may rely on the times of arrival of known signals with a known propagation speed, time delays (e.g., observed time difference of arrival (OTDOA), or based on radiation beam vectors used at a gNB(s), or other technique. These alternative positioning techniques may typically rely on having a line-of-sight (LOS) path between the UE and all of the used gNBs and/or other UEs or other network nodes for the triangulation or time delay calculations. However, a problem may arise since, at least in some cases: 1) relying on a non-line-of-sight (NLOS) path for the UE positioning calculation may introduce significant errors (and thus, use of a non-line-of-sight (NLOS) path for UE positioning may typically render the UE positioning calculation as erroneous or at least very unreliable), and 2) a UE may be unable to determine whether a UE-gNB path is a line-of-sight (LOS) path or non-line-of-sight (NLOS) path.

According to an example embodiment, a line-of-sight (LOS) path may include a signal path between a signal source and a receiver where the signal may travel in a direct path from the signal source to a receiver, e.g., without being reflected. Thus, for example, no signal obstructions or reflectors are typically present in the direct path between a signal source and a signal receiver for a LOS path, at least for some range of frequencies. On the other hand, a non-line-of-sight (NLOS) path may be a signal path that is not LOS, e.g., such as where an object may block the signal, and/or the signal may be reflected (e.g., thus preventing signal propagation along the direct path between the signal source and receiver). Due to a different signal path for LOS and NLOS, the signal delay and angle of arrival of the signal may be different for a LOS path as compared to a NLOS. For example, a LOS path may include where a signal propagates in a direct path from gNB to UE. On the other hand, a NLOS path may, for example, include a presence of a blocker (blocking object that blocks the signal) or a signal reflector, causing the signal to propagate via a NLOS path that is not (or at least not completely) a direct path between UE and gNB. Thus, for example, relying on a NLOS path for UE positioning may cause an erroneous UE positioning calculation, e.g., if the NLOS path was assumed to be LOS.

According to an example embodiment a gNB may support beam forming by transmitting control signals via different gNB transmit beams, e.g., to allow a UE to measure a reference signal received power (RSRP) of the beams, and then report back to the gNB the beams having a highest measured RSRP, for example. According to an example embodiment, a gNB (or BS) may transmit one or more synchronization signal blocks (SSBs), where each SSB may include, for example, primary synchronization signals (PSS), secondary synchronization signals (SSS) and a physical broadcast channel (PBCH). A UE may use the PSS and SSS to find and synchronize with a gNB or cell. The PBCH may include or carry a master information block (MIB) that the UE may use to acquire remaining system information. In some cases, there may be one SSB transmitted per beam, for each of a plurality of beams transmitted by a gNB (or BS) or cell. Also, for example, a gNB may transmit channel state information-reference signals (CSI-RS) via each of a plurality of CSI-RS beams, which may be a narrower, more refined, set of beams, as compared to the wider SSB beams. After establishing a connection with a gNB, a UE may, from time to time, measure and report (e.g., select) a CSI-RS beam having a highest RSRP, and report this CSI-RS beam(s) to the gNB. Thus, a UE may perform signal measurements based on either received channel state information-reference signals (CSI-RS) and/or received SSBs, and may report one or more SSB beams and/or CSI-RS beams to the gNB based on the measurements. A selected SSB beam(s) and/or CSI-RS beam(s) (e.g., a best beam or beam having a highest RSRP) may be reported or indicated by the UE sending to the gNB a beam identifier for the selected (e.g., best) beam, which, e.g., may be a beam index or a relative time or time offset when the beam was transmitted, etc., or other beam identifier. Thus, for example, the selected (e.g., selected by the UE based on RSRP) or indicated SSB beam(s) and/or CSI-RS beam(s) may be used as gNB transmit beams when the gNB transmits to the UE.

Figure 2:
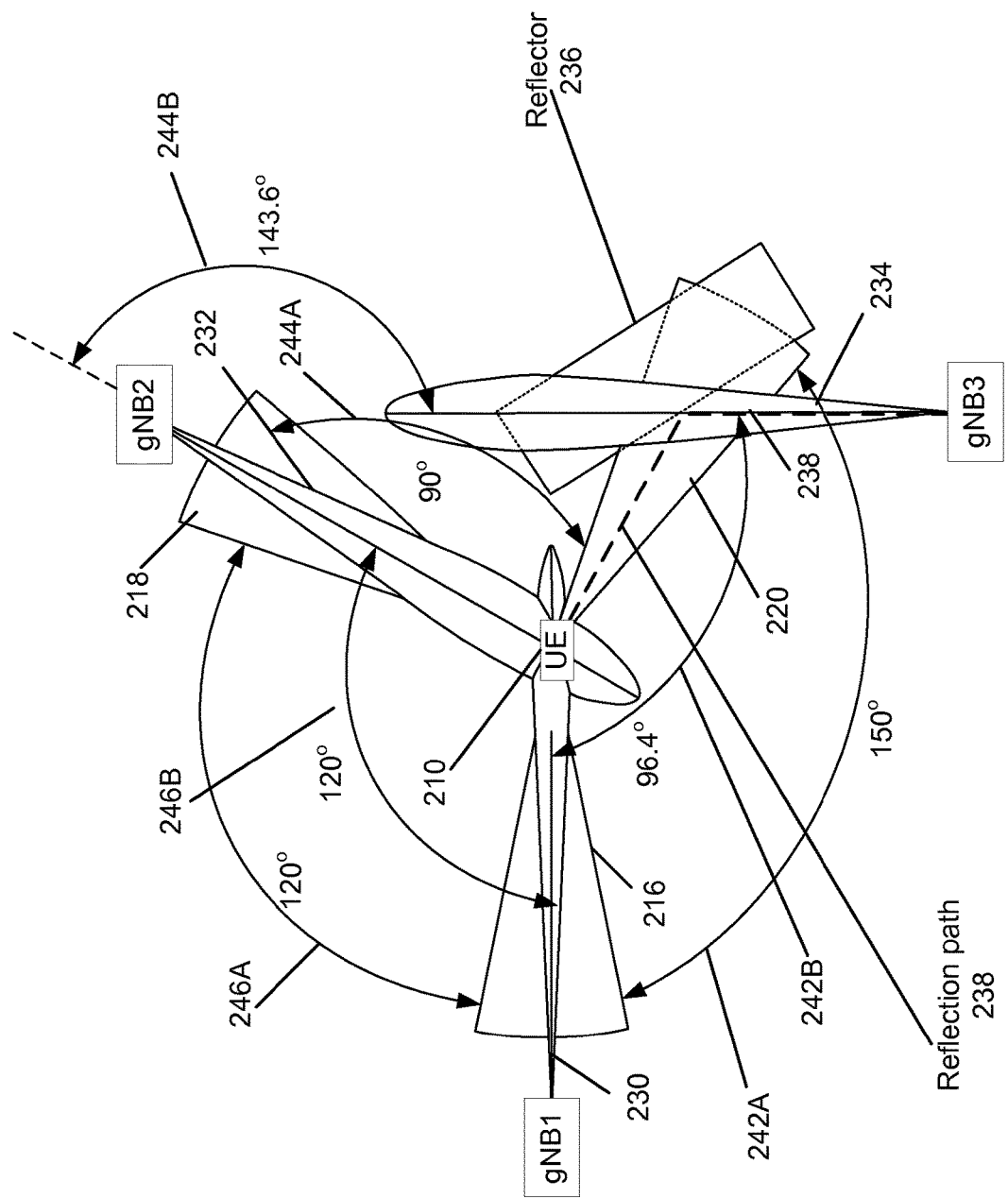
FIG. 2 is a diagram illustrating a non-line-of-sight path due to a signal reflection according to an example embodiment.

FIG. 2 is a diagram illustrating a non-line-of-sight path due to a signal reflection according to an example embodiment. A UE 210 may be in communication with multiple gNBs (base stations), including gNB1 (e.g., which may be a serving gNB, where a connection has been established between UE 210 and gNB1), a gNB2, and a gNB3 (e.g., where gNB2 and gNB3 may be non-serving, or neighbour, gNBs for the UE, for which there is currently no connection established between UE and either gNB2 or gNB3). UE 210 may use a UE receive beam 216 to receive a signal from gNB1 via a selected narrow (e.g., CSI-RS) gNB transmit beam 230. Thus, as shown in FIG. 2, gNB transmit beam 230 points from gNB1 to UE 210. Similarly, for gNB2, a UE receive beam 218 is used to receive a signal from gNB2 via a selected (e.g., SSB) gNB transmit beam 232. gNB transmit beam 232 points toward UE 210. Thus, as can be seen in the example of FIG. 2, the signal path between UE 210 and gNB1 is a LOS path, and the signal path between UE 210 and gNB2 is a LOS path.

Also, as shown in FIG. 2, UE 210 may use receive beam 220 to receive a signal from gNB3. Thus, for example, when the UE 210 measured the SSB beams transmitted by gNB3, the gNB transmit beam 234 may have been measured by the UE 210 as being the best (e.g., having a highest RSRP). Thus, in this example, a gNB transmit beam of gNB3 that points from gNB3 toward UE 210 (not shown) may not have been measured as being a good or strong beam (e.g., having a low RSRP), e.g., due to a blocking object, not shown. Thus, due to a blocking object (not shown in FIG. 2), which may block a direct signal path between UE 210 and gNB3, the signal from gNB3 may follow a reflection path 238, including reflecting off of reflector 236, and then traveling to UE 210 (which is not a direct path). Thus, as shown in FIG. 2, the gNB transmit beam 234 used by gNB3 points toward the reflector 236, and does not point towards UE 210. As a result, the signal path between gNB3 and UE 210 may be considered a NLOS path.

Also, as noted above, the LOS signal paths (e.g., signal path between UE 210 and gNB1, and signal path between UE 210 and gNB2) may be relied upon or used to accurately determine UE position because these are LOS paths. On the other hand, the NLOS path between gNB3 and UE 210 (e.g., following the reflection path 238 via reflector 236) should not be relied upon or used to determine UE position, since using the NLOS path in a UE positioning calculation may typically result in a calculated UE position that is erroneous.

As shown in FIG. 2, certain angles may indicate (or may be compared to determine) whether a UE-gNB path is LOS or NLOS. For example, an angle 242A between UE receive beam 216 and UE receive beam 220 is approximately 150°, and an angle 242B between gNB1 transmit beam 230 and gNB3 transmit beam 234 is approximately 96.4°. Thus, the UE-perspective (angle 242A, between UE receive beams) of these relative angles does not match the gNB perspective (angle 242B, between the two gNB transmit beams) of these relative angles, between gNB1 and gNB3, which may indicate that one or both of the signal paths from UE 210 to gNB1 and/or from UE 210 to gNB3 is a NLOS path. An angle 246A (determined from UE perspective) between UE receive beam 216 and UE receive beam 218 may be approximately 120°, which matches the angle 246B (e.g., an angle from network or gNB perspective) between gNB1 transmit beam 230 and gnB2 transmit beam 232. Thus, for example, in this case, because angles 246A and 246B (between or associated with gNB1 and gNB2) are approximately the same (e.g., within a range or within a threshold), then this may indicate that both the signal path between UE 210 and gNB1 and the signal path between UE 210 and gNB2 are LOS paths. Also, angle 244A between UE receive beam 218 and UE receive beam 220 is 90°, which does not match the gNB-based angle 244B of 143.6° between gNB2 transmit beam 232 and gNB3 transmit beam 234. Thus, because both pairs of angles associated with gNB3 do not match within a range or threshold (e.g., angle 242A does not match angle 242B, and angle 244A does not match angle 244B), then this may indicate that the signal path between UE 210 and gNB3 is a NLOS path. Although not shown in FIG. 2, the UE-calculated angles 242A, 244A and/or 246A may each be measured as an angle between corresponding edges (e.g., both left edges, or both right edges) of two UE receive beams, and/or may be measured as the angle between a center or middle of two UE receive beams, for example.

Figure 3:
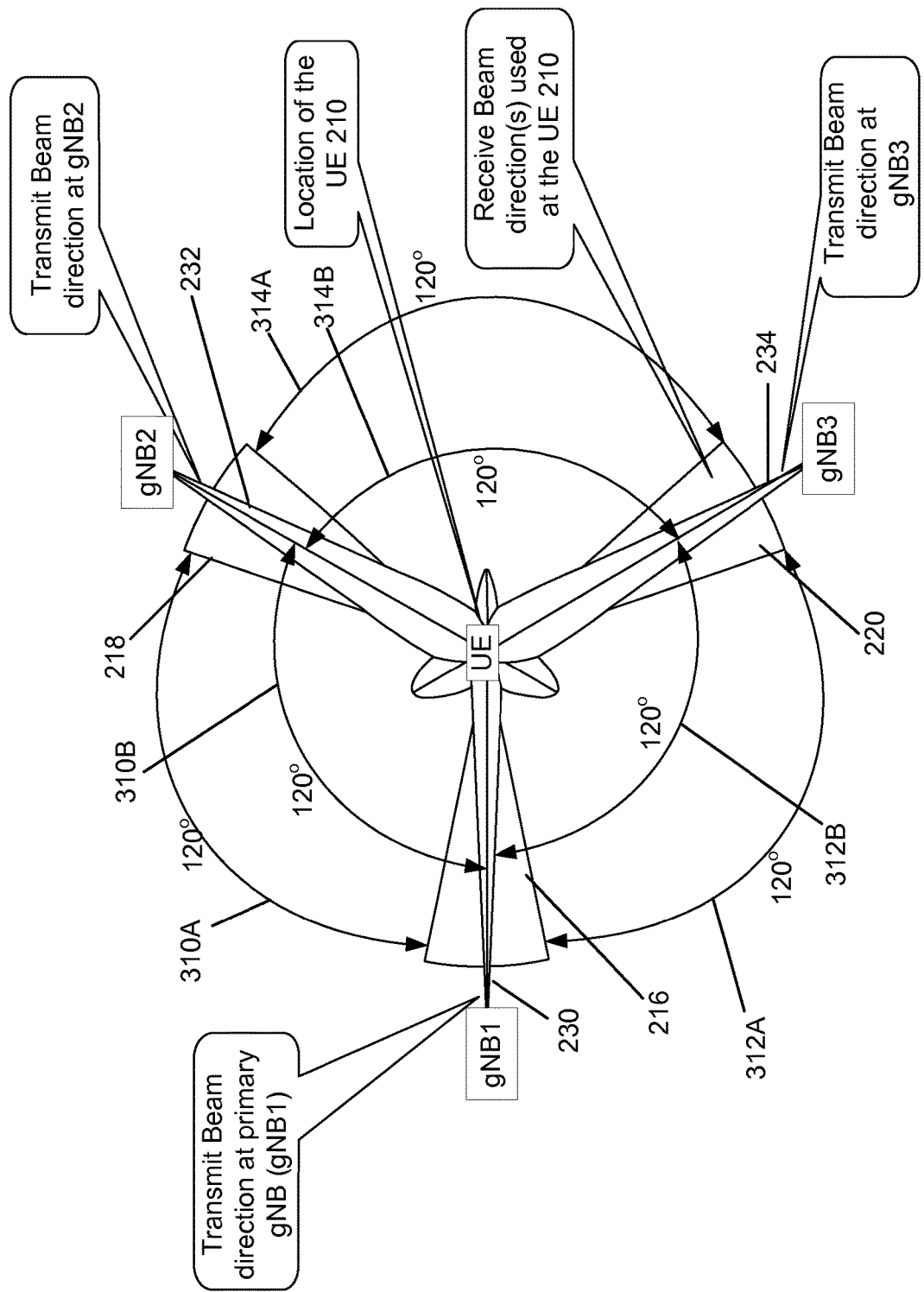
FIG. 3 is a diagram illustrating angle correlations or angle comparisons for a fully line-of sight case according to an example embodiment.

FIG. 3 is a diagram illustrating angle correlations or angle comparisons for a fully line-of sight case according to an example embodiment. In the illustrative example shown in FIG. 3, all three UE-gNB signal paths are LOS paths. For example, this may be determined by calculating and comparing corresponding or associated angles from UE perspective (e.g., an angle between UE receive beams, in a simple example) and from the gNB perspective (e.g., an angle between gNB transmit beam directions, from gNB or network perspective). A beam direction may, e.g., refer to a center (or middle) of a beam, or a point of highest power of the beam, or other location or point within the beam. According to an example embodiment, a match (within a threshold) of one pair and/or both pairs of angles associated with a gNB may indicate that the UE-gNB signal path is LOS. On the other hand, according to an example embodiment, a mismatch of both pairs of angles associated with a gNB may indicate that the UE-gNB path for that gNB is NLOS. The angles to be compared may include a UE-calculated angle and a corresponding gNB-based angle. For example, as shown in FIG. 3, angle 310A between UE receive beams 216 and 218 approximately matches the angle 310B between gNB1 transmit beam 230 and gNB2 transmit beam 232 (e.g., both angles 310A and 310B are approximately, or within a threshold range, 120°). Similarly, angle 314A between UE receive beams 218 and 220 approximately matches the corresponding angle 314B between gNB2 transmit beam 232 and gNB3 transmit beam 234 (e.g., both angles are approximately 120°). Thus, for example, because in this illustrative case, both angle pair 310A/310B approximately matches, and angle pair 314A/314B approximately matches, (both angle pairs associated with gNB2), this may indicate or mean, for example, that signal path between UE 210 and gNB2 is LOS. Similarly, angle 312A between UE receive beams 216 and 220 approximately matches the corresponding angle 312B between gNB transmit beams 230 and 234. Thus, because all three angle pairs approximately match (e.g., in this illustrative example, angle 310A approximately matches corresponding angle 310B, angle 312A approximately matches corresponding angle 312B, and angle 314A approximately matches corresponding angle 314B), this may indicate that all three of the UE-gNB signal paths are LOS, and thus, may be relied upon for an accurate UE positioning calculation.

On the other hand, in FIG. 2, the angle 242A does not match the corresponding angle 242B (associated with gNB1 and gNB3), and angle 244A does not match corresponding angle 244B (associated with gNB2 and gNB3), where the common gNB for these two pairs of angles is gNB3. Thus, as shown in FIG. 2, the mismatch of both pairs of angles (e.g., angles 242A and 242B do not approximately match, and angles 244A and 244B do not approximately match) associated with gNB3 (the gNB associated with the two mismatched pairs of angles) may indicate that the UE-gNB3 signal path is NLOS.

A UE 210 may select or determine a gNB transmit beam for each of a plurality of gNBs. For example, the UE (e.g., UE 210, FIGS. 2-3) may determine or select a CSI-RS (e.g., narrow or refined) transmit beam that a serving gNB (e.g., gNB1, FIG. 2) is using for transmission to the UE 210. Likewise, based on signals received from one or more other (non-serving or neighbour) gNBs via the gNB's beam sweeping, the UE 210 may determine a best beam (e.g., SSB beam) for each of one or more non-serving gNBs (e.g., SSB beam(s) having a highest RSRP). Example non-serving gNBs may include, e.g., gNB2 and gNB3 in FIG. 2. The beam measurement and reporting (and UE beam selection) may occur at different times for different gNBs. For example, after establishment of a connection the UE 210 may measure and report the beam identifier (e.g., beam index) of the best CSI-RS beam transmitted by the serving gNB (e.g., gNB1, FIG. 2). Also, e.g., at a different time, as part of beam measurement and reporting for neighbour or non-serving gNBs, the UE 210 may measure and report to its serving gNB (gNB1) a beam identifier (e.g., beam index) for one or more best beams (e.g., beams having a highest RSRP measured by UE) received from one or more neighbour/non-serving gNBs.

According to an illustrative example embodiment, it may be desirable to determine which UE-gNB signal paths are LOS and which UE-gNB signal paths (if any) are NLOS, e.g., so that a UE positioning calculation (or other function or calculation) for a UE may use only LOS signal paths, and may omit or discard data or signals associated with a NLOS signal path (since use of a NLOS signal path may lead to an erroneous UE positioning calculation). Thus, various example embodiments may include determining or detecting if a UE-gNB signal path is LOS or NLOS.

Rather than simply using a UE receive beam (e.g., UE receive beams 216, 218, 220) to estimate a general beam direction of a gNB transmit beam (e.g., to determine a direction of gNB transmit beams 230, 232 and 234, respectively), UE 210 may use a direction of arrival (DOA) technique, or other technique, to more accurately estimate or determine a gNB transmit beam direction (from the UE perspective, or as determined by the UE). Thus, for example, the direction (e.g., center) of receive beams 216, 218 and 220 may be or may indicate either a direction of receive beams (used to receive the signal from gNB), or may indicate a UE-calculated (estimated) direction of the corresponding gNB transmit beam (e.g., using a DOA technique). In such a case where the UE may use DOA or other technique to more accurately determine or estimate gNB transmit beam directions, angles 242A, 244A and 246A may be UE-calculated (UE-estimated) angles between pairs of estimated gNB transmit beam directions 230, 232 and 234 (estimated from UE-perspective). Whereas, for example, angles 242B, 244B and 246B may be actual angles (from gNB perspective, or based on actual gNB transmit beam directions) between pairs of gNB transmit beams 230, 232, and 234. Furthermore, rather than using actual gNB transmit beam directions to determine angles 242B, 244B and 246B, gNBs may alternatively use a DOA technique to estimate gNB transmit beam directions towards the UE. The gNB(s) may determine gNB beam directions, e.g., based on signals transmitted (e.g., by the UE) and received by each gNB. For example, the serving gNB (e.g., gNB1) may use a DOA technique instead of actual beam directions (SSB and CSI-RS beam directions). The non-serving gNB may also use DOA techniques if a reference signal is transmitted from the UE in the directions of the gNB's. According to an example embodiment, a mismatch between one or more of UE-calculated angles 242A, 244A and 246A as compared to corresponding gNB-based (from perspective of the gNBs or network) angles 242B, 244B and 246B, respectively, may indicate that a UE-gNB path is NLOS.

According to an example embodiment, a location server (LS) 160 (e.g., as shown in FIG. 1 and/or FIG. 4) may estimate or determine a position (location) of a UE, e.g., based on information provided by one or more gNBs (including at least from the serving gNB) and/or based on information provided by the UE. The LS 160 may be provided at (or implemented on) any of one or more locations or network nodes, such as at (or on) a cloud server, a gNB/BS, a node or server that is part of a core network (CN), on a server at the network edge, or on or as part of other network node or network entity. LS 160, in order to accurately determine a UE position, may determine which UE-gNB paths are LOS, and which (if any) UE-gNB signal paths are NLOS. As noted, to determine accurate UE positioning, the LS 160 may then omit or discard signals or information associated with (or received via) any NLOS signal paths (e.g., where the LS 160 may then determine a UE position based only on information or signals associated with LOS paths of the UE). Alternatively, rather than discarding the NLOS path(s) from the positioning calculation, the LS may compensate for the NLOS path, e.g., by adjusting the positioning based on the NLOS path that is used.

Thus, for example, in order to determine which paths are LOS and which paths may be NLOS, the LS 160 may, for example, compare UE-calculated angle information to gNB-based angle information. Thus, the LS 160 may correlate or compare one or more UE-calculated angles to one or more corresponding gNB-based angles, where a mismatch of corresponding angles (e.g., a mismatch or angle difference that is greater than a threshold amount) may indicate that an associated UE-gNB signal path is NLOS. For example, an angle mismatch between a UE-calculated angle and a corresponding gNB-based angle may indicate that the LS and gNB view of the direction of gNB transmit beam(s) does not match the UE view (or UE perspective or UE estimate) of the direction of the gNB transmit beam(s) for that gNB, where such angle mismatch may be a result of a NLOS path between the UE and the corresponding gNB. In other words, the LS 160 may determine (or detect) that a NLOS path exists between a UE and a gNB by comparing (or based on a comparison of) UE-calculated angle information to gNB-based angle information.

According to an example embodiment, UE-calculated angle information may include angles between gNB transmit beam directions calculated (or estimated) by the UE. A UE 210 may determine a general beam direction based on the UE receive beam used to receive a best (e.g., highest RSRP) gNB transmit beam. Thus, as shown in FIG. 2, UE 210 may use a UE receive beam 216 to receive signals transmitted by gNB1 via gNB transmit beam 230. The UE 210 may not have access to (or may not receive) specific beam information (including specific beam directions) of gNB transmit beams used by a gNB. Thus, one or more techniques may be used by a UE to determine or estimate a beam direction for a gNB transmit beam used by each of one or more gNBs. For example, a direction of arrival (DOA) technique may be used by a UE using a UE antenna array. For example, according to an illustrative DOA technique, the UE antenna array may be electronically steered different directions (e.g., by applying different sets of antenna array weights to the antenna array, to create different UE receive beams at different directions and/or at different beam widths or beam shapes), and then the UE may measure the output power of a received signal for each of the different directions (or different beams). For example, a beam direction of a gNB transmit beam may coincide with (or may be determined as) the steering direction (steered direction of the UE antenna array) that resulted in the highest or maximum output power, among the different steered directions. This is merely one example technique, and the UE may use other techniques to more accurately determine or estimate a beam direction for a gNB transmit beam.

On the other hand, gNB-based (or network-based) angle information may include angles determined or calculated (e.g., calculated by a LS 160 or other network entity) based on information known by the LS or network and/or based on information received from a gNB(s), such as from the serving gNB and/or non-serving gNBs, including specific beam directions of each beam (e.g., CSI-RS beam and/or SSB beam) of a set of beams transmitted or used by the gNB. The gNB-based (or network-based) angle information does not include UE-calculated angle information (note that the UE may not have access to beam configuration or beam information, and thus, may not know the actual gNB transmit beam directions, and thus, the UE may use DOA or other technique to estimate these gNB transmit beam directions). For example, the LS 160 may receive beam information describing the beams transmitted by each of the gNBs (e.g., by gNB1, gNB2, gNB3, . . . ), including the beam directions (e.g., beam direction with respect to an antenna array orientation of the gNB) of each of a plurality of beams transmitted by the gNB. The LS 160 may also receive a beam identifier (e.g., beam index, or a time stamp when the UE received the highest RSRP level (e.g., where the time stamp may be mapped to a specific gNB transmit beam)) that identifies a gNB transmit beam(s) selected or identified by the UE as the best (e.g., having a highest RSRP) gNB transmit beam (e.g., beam indexes or time stamps indicating the gNB transmit beams selected and used by gNB1, gNB2 and gNB3, . . . to transmit to the UE 210). Thus, based on the beam information (e.g., indicating at least different beam directions for various gNB beam indexes) and the beam index indicating the gNB transmit beam used by a gNB to transmit to the UE 210, the LS 160 may determine the beam direction of the gNB transmit beam for the UE. Thus, according to an example embodiment, a gNB transmit beam direction may be determined, e.g., as a sum of the angle (or orientation) of the gNB antenna array used to transmit the beam, and the transmit beam direction with respect to the angle (or orientation) of the gNB antenna array. As a result, the LS 160 may determine angles between each of the gNB transmit beam directions.

As noted, a beam identifier may identify a beam (e.g., CSI-RS beam or SSB beam). For example, the beam identifier may include a beam index, or a time stamp identifying a time when the user equipment received a best beam (e.g., received a beam having a highest RSRP, for example). The UE can receive one or more SSB (synchronization signal block beam) sweeps from the gNB and the UE may select the beam with the best or highest RSRP for time synchronization using the Primary Synchronization Signal (PSS) and the secondary Synchronization Signals SSS, which is part of the SSB message. The UE may also decode the Master Block Information (MIB), which will contain information on where and when the System Information Block1 is located, where after the UE may decode the SIB1 (system information block 1 broadcasted by the gNB). The SIB1 contains information of the SSB burst sequence, such as ssb-PositionsInBurst and ssb-PeriodicityServingCell. Various example time stamps may be used to identify a beam. For example, as a first option, the UE may inform ssb-PositionsInBurst (identifying the SSB beam position in the burst or sweep pattern of SSB beams) to the LS. As a second option for a time stamp, the UE may inform the LS about the absolute time the UE received the best SSB beam (e.g., the SSB having a highest measured RSRP). If the LS knows the timing of the SSB sweep pattern (e.g., the absolute time that each SSB beam occurs or is transmitted in the SSB sweep pattern of the gNB), the LS may then align that time stamp with a specific SSB beam time in the SSB beam sweep pattern (e.g., since the LS knows the time of transmission for each of the beams in the beam sweep pattern). Other example time stamps may also be used.

Alternatively, with respect to determining gNB-based angle information, instead of using beam information and beam identifiers to determine gNB transmit beam directions (with respect to the UE), one or more of the gNBs may use a DOA technique to determine a gNB transmit beam direction (e.g., from gNB to UE), such as based on UE signals received by the gNB from the UE. In this manner, each gNB may use DOA to determine a direction of the UE (the direction from each gNB to the UE). In such case, for example, according to an illustrative DOA technique, the gNB antenna array may be electronically steered different directions (e.g., by applying different sets of antenna array weights to the antenna array, to create different gNB receive beams at different directions and/or at different beam widths or beam shapes to receive a signal(s) from the UE), and then the gNB may measure the output power of a received signal (e.g., received by the gNB from the UE) for each of the different directions (or different beams). For example, a beam direction of a gNB transmit beam to (or towards) the UE may coincide with (or may be determined as) the steering direction (steered direction of the gNB antenna array) that resulted in the highest or maximum output power at the gNB, among the different steered directions, based on the signal(s) received by the gNB from the UE. Each gNB may forward to the LS 160 its estimated gNB transmit beam direction with respect to the UE, or may forward its estimated gNB transmit beam direction to the LS 160 via the serving gNB (e.g., via gNB1).

According to an illustrative example, a gNB with digital beam steering and a calibrated uniformly spaced antenna manifold can calculate the far-field characteristics of the antenna array together with the Spatial Correlative Matrix. The Eigen-Values can now be optimized for maximum Power or SINR and the Eigen-Vector corresponding to those Eigen-Values can be derived, to obtain the Best Direction of the beam.

As noted, a comparison of UE-calculated angle information to corresponding gNB-based (or network-based) angle information may be used to detect a NLOS path. For example, as shown in FIG. 2, a NLOS path for gNB3 may be detected where the UE-calculated angle 242A does not match (e.g., within a threshold amount) the corresponding gNB-based angle 242B (these angles being associated with or between gNB1 and gNB3), and UE-calculated angle 244A does not match (e.g., within a threshold amount) the corresponding gNB-based angle 244B (these angles being associated with or between gNB2 and gNB3), where the common gNB for these two pairs of angles is gNB3. Thus, in this illustrative example, as shown in FIG. 2, the mismatch of both pairs of angles associated with gNB3 may indicate that the UE-gNB3 signal path is NLOS. On the other hand, the angles 246A and 246B (associated with or between gNB1 and gNB2) match or correlate, within a threshold amount, which may indicate that the UE-gNB1 path and/or the UE-gNB2 path are both LOS, for example. Therefore, according to an example embodiment, LS 160 may calculate UE position of UE 210 based on (or via) UE-gNB1 path and the UE-gNB2 path (since these are determined as LOS paths), while omitting or discarding positioning information or signals associated with the UE-gNB3 path (which may be determined as a NLOS path).

According to an example embodiment, a UE 210 may calculate UE-calculated angle information and forward this UE-calculated angle information to the LS 160 via the serving gNB (e.g., via gNB1, shown in FIGS. 2-3). The LS 160 may receive the UE-calculated angle information. As an illustrative example, referring to FIG. 2, the UE-calculated angle information may include or may refer to angles (determined from the UE-perspective, e.g., based on DOA or other beam direction estimation technique) measured by the UE 210, such as angles 242A, 244A and/or 246A.

LS 160 may also receive a plurality of beam identifiers (e.g., beam indexes) identifying each beam of a plurality of gNB transmit beams selected by the UE, and used by gNBs to transmit signals to the UE. The LS 160 may receive other beam information, e.g., such as beam directions for one or more gNB transmit beams used or transmitted by each of one or more gNBs (e.g., by serving gNB1, and neighbour/non-serving gNB2, gNB3). The LS 160 may then determine gNB-based (or BS-based) angle information including a gNB-based angle between gNB transmit beam directions of one or more pairs of a plurality of the UE-selected gNB transmit beams (e.g., gNB-based angles 242B, 244B, and/or 246B), e.g., based on the beam identifiers (e.g., beam indexes or time stamps) identifying the UE selected gNB transmit beams for each of the gNBs and beam information (e.g., which may indicate beam directions of a set of gNB beams used by each gNB that indicates beam directions of at least the identified gNB transmit beams 230, 232 and 234, FIG. 1, for example), or based on the estimated gNB transmit beam directions for beams 230, 232 and 234 obtained by gNBs via DOA or other technique. For example, LS 160 may determine a beam direction associated with each of the beam identifiers (e.g., LS 160 may determine a beam direction of each of gNB transmit beams 230, 232 and 234, FIG. 1). As an illustrative example, the LS 160 may determine gNB-based (e.g., from the gNB and LS perspective) angles based on the received beam identifiers (beam indices) and beam information known by the LS and/or received by the LS 160 from one or more gNBs. Alternatively, LS 160 may determine gNB-based angles based on estimated gNB transmit beam directions estimated by gNBs via DOA (or other technique). For example, gNB-based (or network-based) angles (angles between beam directions of gNB transmit beams 230, 232 and/or 234) determined by the LS 160 (or determined by the network) may include angles 242B, 244B and/or 246B (e.g., see FIG. 2). According to an example embodiment, LS 160 may compare each of the angles of the UE-calculated angle information to corresponding angles of the gNB-based (or network-based) angle information. For example, LS 160 may: compare (or correlate) UE-calculated angle 242A to gNB-based angle 242B; compare UE-calculated angle 244A to gNB-based angle 244B; and/or may compare UE-calculated angle 246A to gNB-based angle 246B. Thus, angles of each of several angle pairs may be correlated or compared (e.g., including comparing angles of the following angle pairs: angles 242A and 242B; angles 244A and 244B; and/or angles 246A and 246B). According to an example embodiment, a matching (or not) within a threshold amount (e.g., within 1%, or within 2%, or within 5%, or within 10% or within 15%, or within 20%, for example) of the angles of each of these angle pairs may indicate whether each UE-gNB path is LOS or NLOS. Matching angles of an angle pair may generally indicate a LOS path for the corresponding gNBs, according to an example embodiment. Whereas, for example, two non-matching angle pairs associated with a gNB may indicate a NLOS path.

Thus, according to an example embodiment, a method may include receiving, by a user equipment (UE, such as UE 210) from a serving gNB (BS) (e.g., such as gNB1, FIG. 2), a location update request; selecting, by the UE, a plurality of gNB transmit beams including a beam for the serving gNB and a beam for each of one or more non-serving (e.g., neighbour) gNBs (e.g., selecting a channel state information-reference signal beam for the serving gNB (e.g., for gNB1), and a SSB beam for each non-serving or neighbour gNB (e.g., for gNB2, gNB3)); determining, by the UE, a beam direction of each beam of the plurality of gNB transmit beams (e.g., UE 210 determining (estimating) a gNB transmit beam direction for each of the selected gNB transmit beams, such as based on DOA or other technique); determining angle information (e.g., UE-calculated angle information) including an angle between UE-estimated beam directions of one or more pairs of beams of the plurality of gNB transmit beams (e.g., which may include UE-calculated angles 242A, 244A, and/or 246A, FIG. 2); and sending, by the UE to the serving gNB in response to the location update request, the angle information (e.g., the UE-calculated angle information), and a beam identifier (e.g., beam index, time stamp or other beam identifier) identifying the selected beam for each of the one or more non-serving base stations (e.g., a beam index identifying the selected SSB beam(s) for each non-serving gNB/BS, such as for gNB2, and/or gNB3). Note that the UE may not need to send to the serving gNB the selected beam index (e.g., CSI-RS beam index) of the beam selected and used for downlink transmission from the serving gNB to the UE 210, since the serving gNB (e.g., gNB1) would already be aware of the beam index of that CSI-RS beam (as it is already being used by the serving gNB).

According to an example embodiment, the selected beam for the serving gNB (serving BS, e.g., such as gNB1, FIG. 2) may include a channel state information-reference signal (CSI-RS) beam that is received by the UE from the serving gNB; and the beam for each of one or more non-serving base stations may include a synchronization signal block (SSB) beam that is received by the UE from each of the one or more non-serving gNBs (e.g., for gNB2, gNB3).

According to an example embodiment, the determining a beam direction may include: determining, by the UE, a beam direction of one or more of the selected beams using a direction of arrival (DOA) technique.

According to an example embodiment, the selecting may include performing the following for each of the one or more non-serving gNBs (non-serving BSs): receiving, by the UE from the non-serving gNB, a plurality of synchronization signal blocks (SSBs), each synchronization signal block (SSB) received via an associated synchronization signal block (SSB) beam; and selecting, by the UE, one or more of the synchronization signal block (SSB) beams from the non-serving gNB having a highest received power (e.g., having a highest RSRP).

According to an example embodiment, the selected beam for the serving gNB may include a channel state information-reference signal (CSI-RS) beam (e.g., beam 230) that is used for communication between the UE and the serving gNB; and the selected beam for each of one or more non-serving gNBs comprises a first synchronization signal block (SSB) beam (e.g., beam 232) for a first non-serving base station and a second synchronization signal block (SSB) beam (e.g., beam 234) for a second non-serving base station; and wherein the determining a beam direction of each beam of the plurality of beams comprises: determining a (UE-calculated) beam direction of the channel state information-reference signal (CSI-RS) beam (e.g., using DOA to determine or estimate a beam direction of beam 230 transmitted by serving gNB1); determining a beam direction of the first synchronization signal block (SSB) beam for the first non-serving base station (e.g., using DOA to determine or estimate a beam direction of beam 232 transmitted by gNB2); and determining a beam direction of the second synchronization signal block (SSB) beam for the second non-serving base station (e.g., using DOA to determine or estimate a beam direction of beam 234 transmitted by gNB3).

According to an example embodiment, the determining the (UE-calculated) angle information may include, for example: determining a first angle (e.g., UE-calculated angle 246A) between the beam direction of the channel state information-reference signal (CSI-RS) beam (e.g., beam 230) and the beam direction of the first synchronization signal block (SSB) beam (e.g., beam 232) for the first non-serving base station; determining a second angle (e.g., UE-calculated angle 242A) between the beam direction of the channel state information-reference signal (CSI-RS) beam (e.g., beam 230) and the beam direction of the second synchronization signal block (SSB) beam (e.g., beam 234) for the second non-serving base station; and determining a third angle (e.g., UE-calculated angle 244A) between the beam direction of the first synchronization signal block (SSB) beam (e.g., beam 232) for the first non-serving base station and the second synchronization signal block (SSB) beam (e.g., beam 234) for the second non-serving base station.

According to another example embodiment, a method may include receiving UE-calculated angle information including a UE-calculated angle between beam directions of one or more pairs of a plurality of UE-selected gNB transmit beams (e.g., receiving UE-calculated angles 242A, 244A and/or 246A, see FIG. 2 as an example), wherein the plurality of UE-selected gNB transmit beams include a beam (e.g., CSI-RS beam 230) for a serving gNB (e.g., gNB1) of the UE and a beam for each of one or more non-serving gNBs (e.g., beams 232 for gNB2, and/or beam 234 for gNB3); determining gNB-based angle information including a gNB-based angle (e.g., gNB-based angles 242B, 244B, and/or 246B) between beam directions of one or more pairs of a plurality of the UE-selected gNB transmit beams; and comparing the UE-calculated angle information with the base station-based angle information (e.g., comparing UE-calculated angle 242A to corresponding gNB-based angle 242B; comparing UE-calculated angle 244A to corresponding gNB-based angle 244B; and/or comparing UE-calculated angle 246A to gNB-based angle 246B).

According to an example embodiment, the method may further include receiving a plurality of beam identifiers including a beam identifier identifying each beam of the plurality of UE-selected gNB transmit beams; determining a beam direction associated with each of a plurality of beam identifiers; and determining, based on the plurality of beam identifiers of the UE-selected gNB transmit beams, a beam direction for each of the UE-selected gNB transmit beams; wherein the determining gNB-based angle information may include: determining, based on the beam direction for each of the UE-selected gNB transmit beams, gNB-based angle information including a gNB-based angle between beam directions of one or more pairs of a plurality of the UE-selected gNB transmit beams.

According to an example embodiment, the method may include receiving, from one or more of the gNBs, an estimate of the beam direction towards the UE (e.g., gNB transmit beams 230, 232 and/or 234), based on a direction of arrival (DOA) technique performed by the one or more gNBs; and wherein the determining gNB-based angle information may include: determining, based on the estimate of the beam direction of the UE gNB-based angle information including a gNB-based angle (e.g., angles 242B, 244B, and/or 246B) between beam directions of towards the UE.

According to an example embodiment, performing a DOA technique by (or at) the gNB's may use or rely on a reference signal (for example SRS or sounding reference signal) transmitted from the UE and received at the gNB. So, based on this reference signal from the UE, the gNB can estimate the direction of the UE and thereby the direction of beams 230, 232, 234 based on an incoming reference signal from the UE. Thus, in this example, the UE participates in the gNB DOA technique only by sending the reference (e.g., SRS) signal to the gNBs, which is then used by the gNB to perform DOA technique.

According to an example embodiment, the method may include determining, based on the comparing, that a communication path between the UE and at least one of the gNBs is a non-line-of-sight (NLOS) path; and determining, based on the comparing, that one or more further communication paths between the UE and at least one of the gNBs is a line-of-sight (LOS) path(s); and, determining a position of the UE based on the one or more line-of-sight paths, while disregarding or not using the non-line-of-sight path.

According to an example embodiment, the method may further include determining a beam direction associated with each of a plurality of beam identifiers (e.g., receiving beam information that may include at least beam directions for one or more beams or beam identifiers; and determining, based on the plurality of beam identifiers of the UE-selected gNB transmit beams, a beam direction for each of the UE-selected gNB transmit beams (e.g., determining a beam direction of each of the selected gNB transmit beams based on beam information that indicates beam directions for a plurality of beams, and the beam indexes that identify the UE-selected beams for each of one or more gNBs). Note that this determination (e.g., by LS 160, or a network node) of (gNB-based) beam direction(s) of gNB transmit beams may be based on beam information that may include beam directions (e.g., known in advance by the LS 160, or provided by gNBs to the LS 160) of a plurality of beams transmitted by each of one or more gNBs, and then a beam index that indicates the specific beam selected or used for each of the gNBs to transmit to the UE. In contrast, the UE-calculated angle information is based on beam directions determined or estimated by the UE, e.g., using DOA or other technique (and not based on the known beam directions, which may typically not be provided to the UE).

According to an example embodiment, the method may further include determining a position of the UE based, at least in part, on the comparing. For example, the determining a position of the UE may include determining, based on the comparing, that a communication path between the UE and at least one of the gNBs is a non-line-of-sight (NLOS) path; and determining a position of the UE, while disregarding or not using the non-line-of-sight (NLOS) path. For example, as shown in FIG. 2, the LS 160 may determine that UE-calculated angle 242A does not match (within a threshold amount) the gNB-based angle 242B, and UE-calculated angle 244A does not match gNB-based angle 244B. The common gNB for these angles is gNB3. Thus, based on these comparisons, the LS 160 may determine that the signal path between UE 210 and gNB3 is NLOS. Thus, LS 160 may determine a position of UE 210 based only on the LOS paths (e.g., based on the signal path between UE 210 and gNB1, and the signal path between UE 210 and gNB2). Data and/or signals acquired via the NLOS path may be omitted or discarded for the UE positioning calculation, because use of the NLOS path may typically cause an erroneous UE position calculation.

Some illustrative example techniques that may be used to determine a UE position based on radio signals may include, e.g., triangulation, multilateration (or tri-lateration), Observed Time Difference of Arrival (OTDOA), and/or fingerprinting. A transmitted signal loses strength as distance increases. Thus, for example, at a distance of one meter, a signal may be relatively strong, and at a distance of forty meters the signal may be correspondingly weaker. A UE may be able to detect and identify specific signal sources, e.g., from different gNBs/BSs (or other signal sources). If the UE can receive signals from at least three sources, the signal strength (from the three sources) may be used to determine each point in a room or within an area. This type of position determination by means of distance measurement using signal strengths may be called lateration, and may be based on signal attenuation and distance for a signal. The inclusion of three signal transmitters may be referred to as trilateration, and may be referred to as multilateration with more than three signal transmitters, for example. Another method for position calculation is triangulation. In contrast to tri-lateration, triangulation may use not only the distances to the UE (sensor), but also angles are used to determine the position of an object. Two angles and one length may be required for a two-dimensional location determination. Angle of arrival (AoA) is the angle at which the signal hits or arrives at the receiver. The angle may be measured using the delay of the signal (e.g., which may be referred to as "Time of Flight" (TOF)). TOF measures the time it takes for a signal to travel between an object and the reference point, the known position of a transmitter (e.g., such as a TOF for a signal to arrive at a UE from a known position of a gNB).

Observed Time Difference of Arrival (OTDOA) is a positioning feature introduced in rel9 E-UTRA (LTE radio). OTDOA is a multilateration method in which the UE measures the time difference between some specific signals from several eNBs and reports these time differences to a specific device in the network (the Evolved Serving Mobile Location Center (ESMLC)). The ESMLC based on these time differences and knowledge of the eNB's locations calculates the UEs' position. The ESMLC requests an OTDOA measurement: a set of RSTD (Reference Signal Time Difference) measurements from the UE. Together with this request the UE receives assistance data. This assistance data, provides a list of cells (eNBs), with their PRS (Positioning Reference Signal) parameters, including bandwidth (BW), periodicity etc. The UE then proceeds to perform these measurements during a given period of time (typically up to 8 or 16 periods of the PRS signals). These measurements consist on estimating the exact time offsets between the PRS from different cells. Then it reports to the ESMLC these estimated time differences together with an estimate of the measurement quality. The ESMLC then, using these time difference estimates, and the knowledge of the cell's (or gNB's) positions and transmit time offsets estimates the position of the UE.

Another way of determining the position may be referred to as fingerprinting. Instead of determining the distance between objects and reference points, the fingerprinting technique matches of signals such as RSSI (Received Signal Strength Indication) and MAC address (Media Access Control address) of devices. A database acting as a "map" may be created with the characteristics of the existing wireless/radio signals at a specific location and at a specific time, and this map may be used to determine locations of a UE based on signals received by the UE that match signals within the map. Other techniques may be used as well to determine a UE position. According to an example embodiment, regardless of the UE positioning technique that may be used by the LS 160 or other node or entity, NLOS paths (or signals from gNBs that are part of a NLOS path to the UE for which a position is being determined) may be omitted or discarded as part of the UE positioning calculation, e.g., in order to improve the accuracy and/or reliability of the UE positioning. Other positioning or location determination techniques may be used as well.

Further example details and embodiments will now be described.

Various example embodiments are described relating to the detection of a NLOS and NLOS paths, e.g., for mmWave, NR, 5G and/or other wireless networks or technologies. An example embodiment may include the following operations (for example):

1. The UE is connected, and beam aligned to a primary gNB, meaning that the gNB and the UE knows the general direction of each other. 2. The UE listens (receives or detects) for SSB's from other (e.g., non-serving or neighbor) gNBs and determines the direction of those gNBs using a DoA technique for an antenna array, or using another technique. 3. The UE calculates the relative angle differences between the estimated directions of the involved gNBs and sends this information to the Location Server (LS) (The indexes of the best SSB beams are also be sent to the LS). 4. The LS knows the CSI-RS and SSB beam patterns of the involved gNBs. 5. The LS calculates the relative angle differences of the CSI-RS (CSI-RS beam) and SSB's (SSB beams) for the involved gNBs. 6. The LS correlates (e.g., compares) the relative angle difference as seen from the gNB (gNB-based angles) and the UE (UE-calculated angles) to detect which paths are LOS and which paths are NLOS. 7. NLOS paths can now be excluded in the UE positioning estimation.

Figure 4:
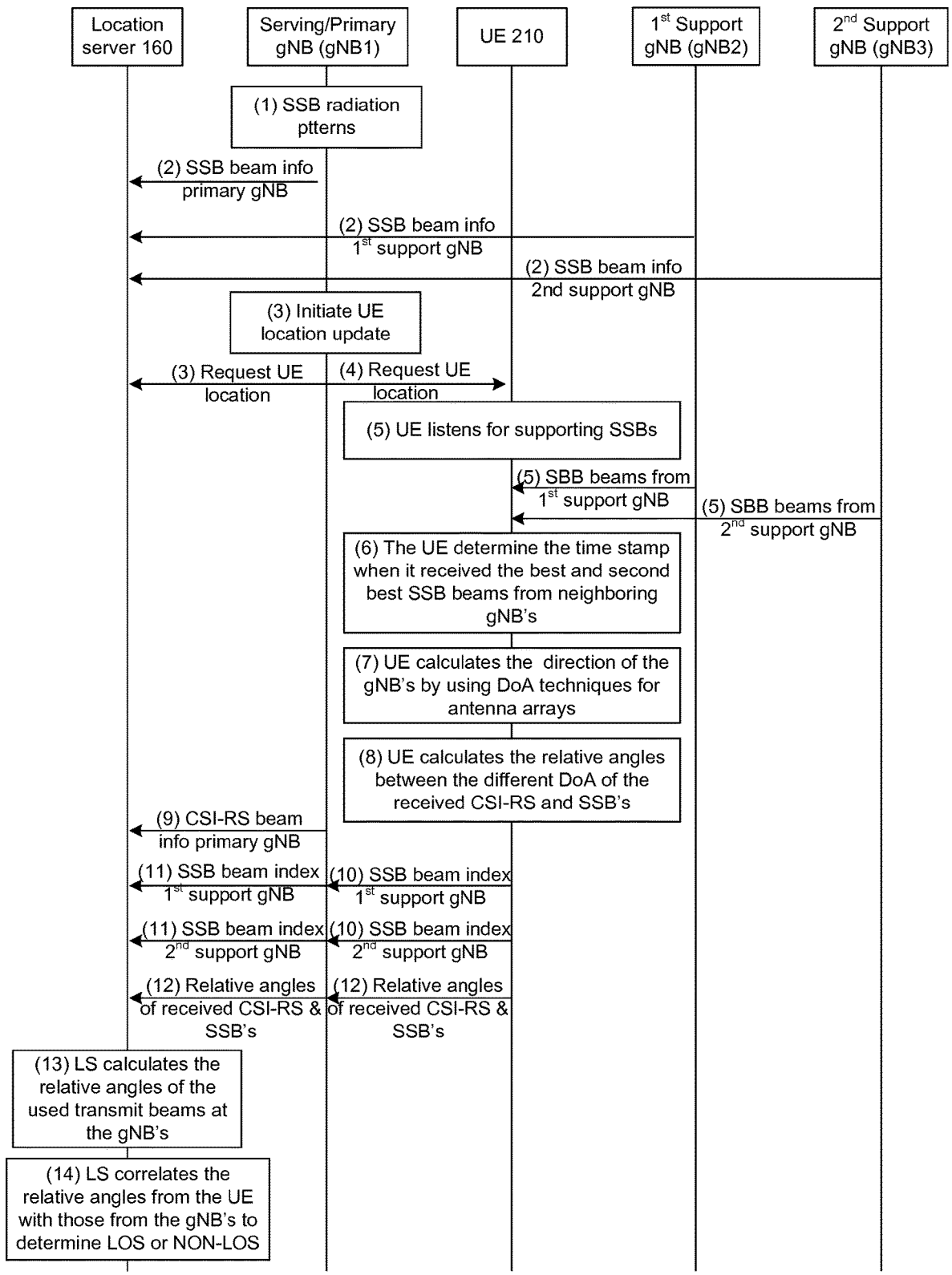
FIG. 4 is a diagram illustrating operation of a system according to an example embodiment.

FIG. 4 is a diagram illustrating operation of a system according to an example embodiment. At 1), each gNB is configured with a specific SSB beam pattern (identifies a set of SSB beams for beam sweeping for that gNB, including SSB indexes for these SSB beams, beam directions (in azimuth and/or elevation directions), beam widths of SSB beams, and/or other beam information). CSI-RS beam information may also be configured for each gNB as well (e.g., which may include CSI-R beam indexes for a set of CSI-RS beams, beam directions, beam widths, . . . ). At 2), beam information is provided to the LS 160 for the serving gNB (gNB1) (CSI-RS beam information, and/or SSB beam information) and for one or more non-serving or neighbor gNBs (support gNBs) (SSB beam information), such as for neighbor gNBs including gNB2, gNB3.

At 3) the primary gNB (e.g., serving gNB (gNB1)) may initiate a location update for a specific UE (e.g., for UE 210) or multiple UE's. At 4), the serving (or primary) gNB (gNB1) sends the Location Update request to the UE(s), including to UE 210, and to the Location Server (LS) 160. Although not shown in FIG. 4, the UE 210 may listen to (detect and/or receive) multiple CSI-RS beams from the serving gNB1, and may select a best (e.g., highest RSRP) CSI-RS beam for the serving gNB1 to use for transmission to the UE 210. Thus, both the UE 210 and the gNB1 know the CSI-RS beam of the serving gNB1 to use for the UE 210. At 5), UE 210 listens (or detects and/or receives) SSB signals from supporting (neighbor) gNBs, including from gNB2 and/or gNB3, etc.

At 6), the UE 210 may determine the Time Stamp and beam index when it received the best and second best SSB beams from neighboring gNBs (from gNB2, gNB3). As noted, the UE 210 and serving gNB (gNB1) already know the best CSI-RS beam of the serving gNB (gNB1) with respect to the UE, as this best CSI-RS beam used by gNB1 was previously determined by gNB1 and/or UE 210, and is already being used by gNB1 to transmit signals to the UE 210 (a connection has already been established between UE 210 and gNB1).

At 7), the UE 210 calculates (or estimates) gNB transmit beam directions for the selected (or best) CSI-RS beam (from gNB1) and selected (or best) SSB beams from neighbor gNBs (from gNB2, gNB3), e.g., by using a Direction of Arrival (DoA) technique for an antenna array(s) (e.g., UE 210 calculates relative beam direction of the best beam with respect to the direction or orientation of the antenna array used by the UE to receive that beam for that gNB monitoring). The UE 210 may determine a gNB transmit beam direction for the serving gNB (CSI-RS transmit beam direction for gNB1) and one or more neighbor or support gNBs (e.g., SSB transmit beam directions), such as for gNB2, gNB3, etc. For example, the UE 210 may determine a gNB transmit beam direction (e.g., using a DOA technique) of CSI-RS beam (transmitted by gNB1) and each of the SSB beams (transmitted by gNB2, gNB3) relative to the angle or orientation of the antenna array(s) used by the UE to receive the CSI-RS beam and to receive the SSB beams. For example, as part of the UE-calculated angle information, as shown in the illustrative example of FIG. 2, operation 7) of FIG. 4 may include the UE 210 determining or estimating gNB transmit beam directions of each of the gNB transmit beams 230, 232 and 234 (e.g., where beam 230 may be a CSI-RS beam from gNB1, and beams 232 and 234 may be SSB beams from gNB2 and gNB3, respectively) for example, such as via use of a DOA technique.

At 8), the UE calculates UE-calculated angle information, e.g., including relative angle differences (e.g., angle differences in 2 dimensions (2D) or in 3 dimensions (3D)) of the beam directions of the gNB transmit beams, as measured or detected by the UE 210. Thus, as an illustrative example, this may include the UE determining angles 242A (e.g., the UE-calculated angle between UE receive beams 216 and 220), 244A (e.g., the UE-calculated angle between UE receive beams 218 and 220, as estimated by the UE), and/or 246A (e.g., the UE-calculated angle between UE receive beams 216 and 218) (e.g., see FIG. 2, as an illustrative example). In an example embodiment, the directions (e.g., center) of receive beams 216, 218 and 220 may be determined based on DOA, and provide an estimate of the directions of the gNB transmit beams 230, 232 and 234.

At 9), the primary (or serving) gNB (gNB1) sends CS-RSI beam information to LS 160. According to an example embodiment, the CSI-RS beam information may, for example, include at least information identifying the beam direction of the selected CSI-RS beam selected and/or used by the serving gNB (gNB1) to transmit signals to the UE 210. CSI-RS beam information provided by gNB1 may include, for example, CSI-R beam indexes for a set of CSI-RS beams, beam directions of each of the plurality of CSI-RS beams, beam widths (e.g., in azimuth and/or elevation), and information (e.g., beam index) identifying the currently used CSI-RS beam for the UE 210.

At 10), the UE 210 may send to gNB1 SSB identifiers (e.g., SSB beam indexes) to identify the selected gNB SSB transmit beams used by neighbor (or support) gNBs (used by gNB2, gNB3 to transmit to UE 210). And, at 11), the serving gNB (gNB1) forwards the SSB identifiers (or SSB indexes) identifying the selected gNB SSB transmit beams used by neighbor (or support) gNBs (e.g., used by gNB2, gNB3 to transmit to UE 210). Thus, at 10) and 11), the SSB beam indexes (e.g., which may include the Time Stamp necessary for the LS 160 to determine the best SSB beam from each support gNB (e.g., gNB2, gNB3, . . . )) is sent from the UE(s) to the Primary (serving) gNB (gNB1), and then is relayed from gNB1 to LS 160.

At 12), the UE 210 sends to LS 160, via serving gNB1, the UE-calculated angle information (e.g., UE-calculated angles between CSI-RS beam of serving gNB and SSB beams of neighbor gNBs), such as, for example, information identifying angles 242A, 244A and/or 246A (e.g., see FIG. 2, as an illustrative example).

At 13), the LS 160 determines, based on the CSI-RS beam information and the SSB beam information (e.g., including the beam directions of these beams) and the beam indexes of these selected CSI-RS beam and SSB beams, the gNB-based (or network-based/network-determined) angle information, e.g., including angles between gNB transmit beams, such as angles between the CSI-RS beam (of serving gNB1) and SSB beams (of neighbor/support gNBs (gNB2, gNB3). According to an illustrative example embodiment, the LS 160 may determine gNB-based (or network-based or network-determined) angle information, such as angles 242B, 244B, and/or 246B (e.g., see FIG. 2 as an illustrative example).

At 14) LS 160 may compare or correlate the UE-calculated angle information with the gNB-based angle information, e.g., to determine whether each of the UE-gNB paths are LOS or NLOS. This may include for example, comparing UE-calculated angle 242A to gNB-based angle 242B, comparing UE-calculated angle 244A to gNB-based angle 244B, and/or comparing UE-calculated angle 246A to gNB-based angle 246B (e.g., see FIGS. 2 and/or 3 that provide illustrative example(s)). Further details and/or example embodiments will now be described.

This section will describe example techniques calculate the relative angles between the used beams at the UE (UE-calculated angle information) and at the gNB (gNB-based angle information). According to an example embodiment, a method or technique may include one or more of the following operations: 1) Define the physical locations of the gNBs and the relative position of the UE (the gNB locations may be fixed, and such gNB locations may be known by the UE, gNBs, LS, and/or communicated to the UE); 2) Determine an angle or orientation of an antenna array at the UE used to receive gNB transmit beams from gNBs; 3) Determine a beam direction of each UE receive beam 216, 218, and/or 220 (direction of the UE receive beam with respect to the angle or orientation of the UE antenna array), e.g., based on DOA or other technique (as noted, the receive beam directions for best or highest power UE receive beams 216, 218, 220, selected or identified by UE as part of DOA, may provide an estimate of the gNB transmit beam directions); 4) Determine or calculate UE-calculated angle information, e.g., including an angle (as determined or estimated by the UE) between beams directions of different pairs of gNB transmit beams, e.g., such as angles 242A, 244A and/or 246A; 5) determine (e.g., by LS 160) the gNB-based beam directions of each of the gNB transmit beams (note that the LS 160, gNBs and/or network may already know or can determine from the gNBs or network the specific beam directions of each of the gNB transmit beams as this information is known by the transmitting gNB, and thus, no DOA technique is required by the LS 160 to estimate such gNB transmit beam directions; whereas the UE may be required to use DOA to estimate such gNB transmit beam directions); Alternatively, gNBs may use DOA technique to determine or estimate the gNB transmit beam directions for gNB transmit beams 230, 232 and 234, and this beam direction information (estimated gNB transmit beam directions) may be provided to LS 160. For example, each gNB may use DOA technique to determine or estimate the gNB transmit beam directions, e.g., based on a reference signal received from the UE. 6) determine gNB-based angle information (e.g., by LS 160), including the gNB or LS determined (or network based or network determined) angles between pairs of gNB transmit beams (or pairs of gNB transmit beam directions), e.g., such as gNB-based angles 242B, 244B, and/or 246B, based on the beam directions of the gNB transmit beams and beam indexes or time stamps of selected gNB transmit beams or based on the estimated gNB transmit beam directions obtained by gNBs, e.g., via DOA; 7) Compare or correlate (e.g., by LS 160) each of the UE-calculated angles with a corresponding gNB-based (e.g., LS-calculated or network calculated) angles, e.g., by comparing UE-calculated angle 242A to a corresponding gNB-based angle 242B; comparing UE-calculated angle 244A to gNB-based angle 244B; and/or comparing UE-calculated angle 246A to gNB-based angle 246B. 8) the LS 160 (or other network node or entity) may then determine whether each UE-gNB path is LOS or NLOS, based on the comparison or correlation of UE-calculated angles to corresponding gNB-based angles.

Figure 5:
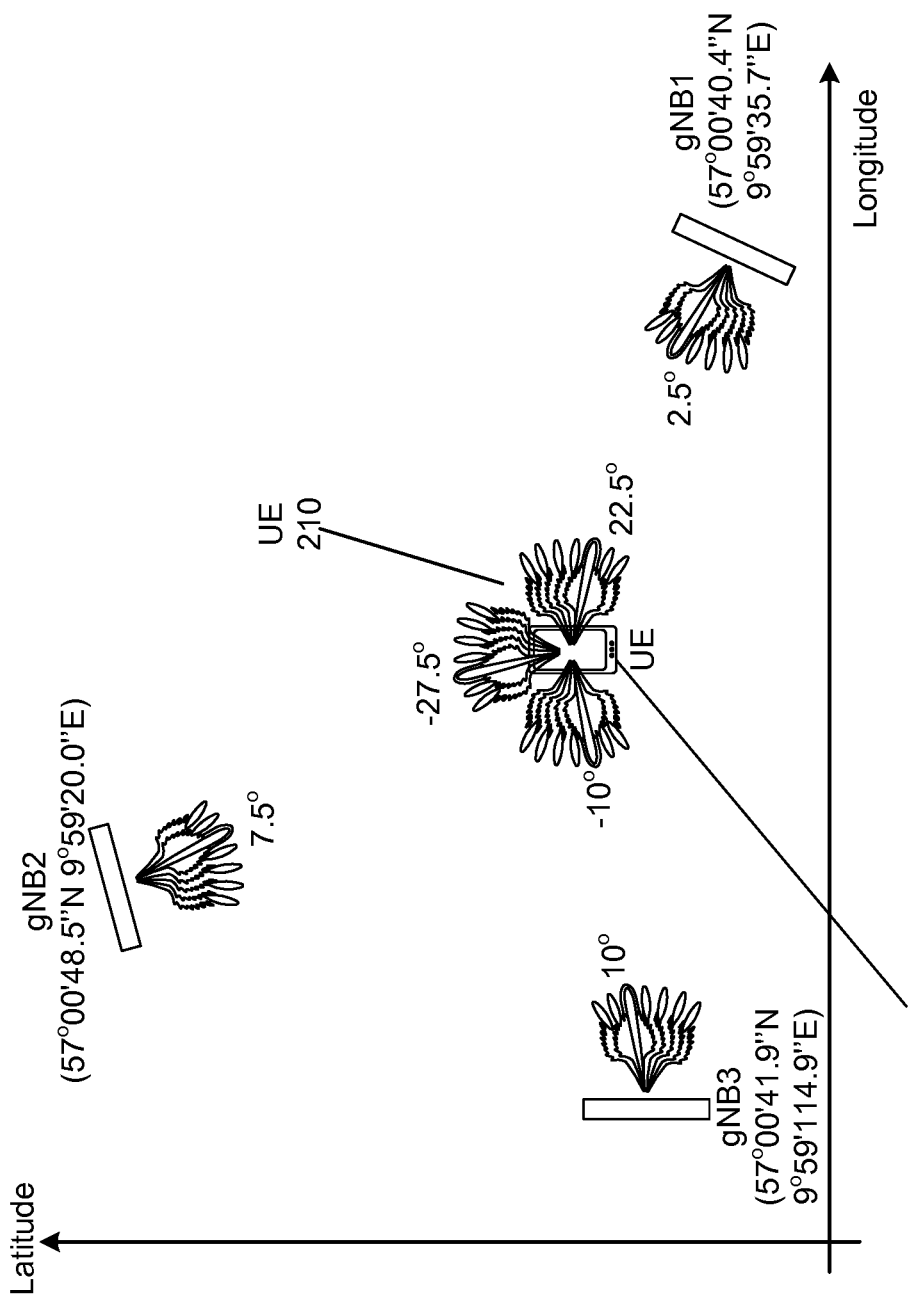
FIG. 5 is a diagram illustrating a 2 dimensional (2D) calculation example with three gNBs and 3 antenna arrays at the UE according to an example embodiment for a LOS case.
Figure 6:
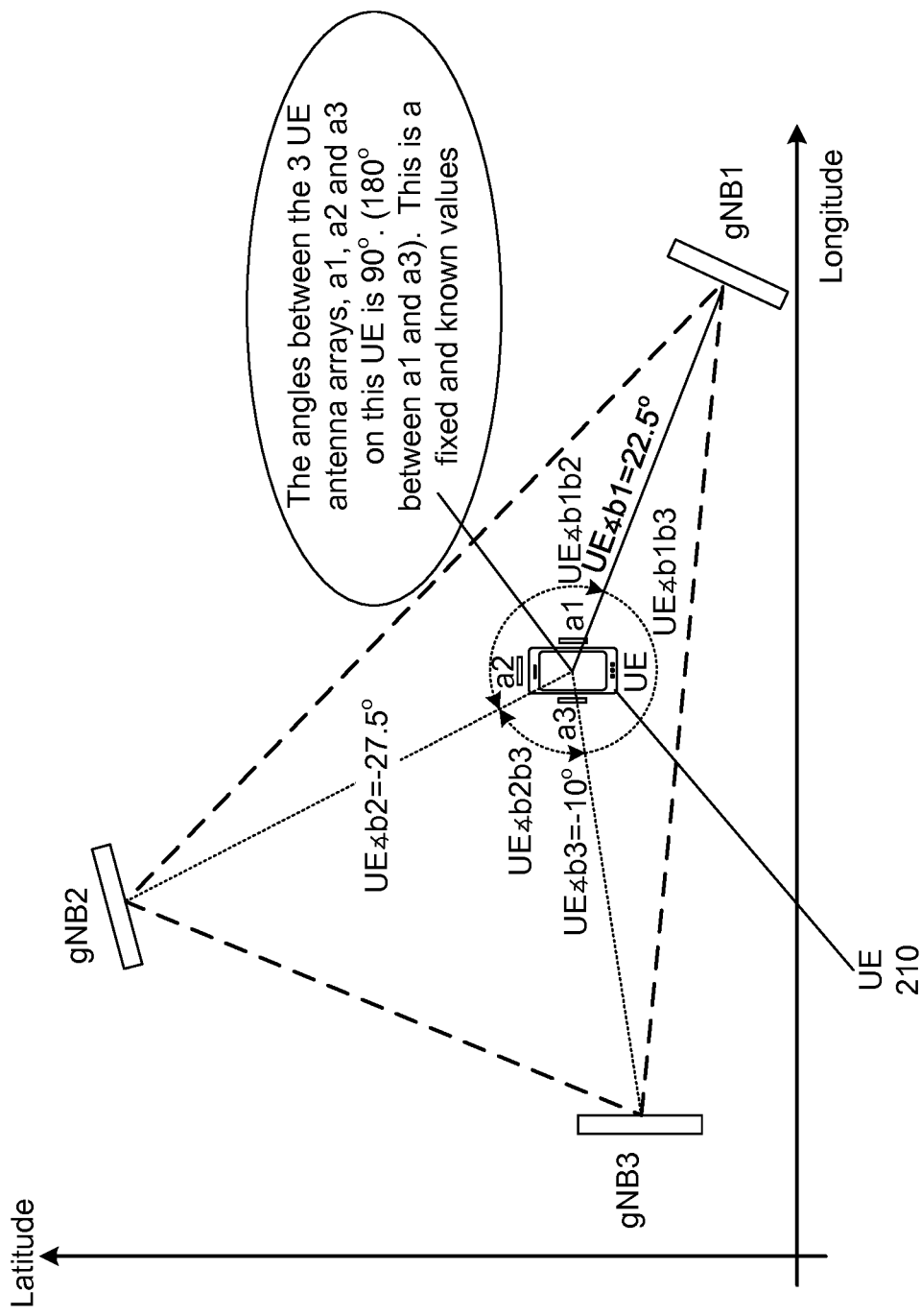
FIG. 6 is a diagram illustrating a UE calculation of angles according to an example embodiment for a LOS case.

FIG. 5 is a diagram illustrating a 2 dimensional (2D) calculation example with three gNBs and 3 antenna arrays at the UE according to an example embodiment for a LOS case. FIG. 6 is a diagram illustrating a UE calculation of angles according to an example embodiment for a LOS case.

As shown in the example of FIG. 5, gNB1 uses a gNB transmit beam (to transmit to the UE 210) at a relative angle of 2.5° (relative to the gNB antenna array angle or orientation); gNB2 uses a gNB transmit beam at a relative angle of 7.5° to transmit to UE 210; and, gNB3 uses a gNB transmit beam at a relative angle of 10°. These three gNB transmit beam angles are, e.g., determined or known by the three gNBs, respectively.

As shown in FIG. 5, a UE 210 may be in communication with (or may be receiving signals from) one or more gNBs, such as with gNB1, gNB2, and gNB3. An antenna array used for beam transmission by each gNB is shown, with a particular orientation or angle. The fixed location of each gNB is also shown.

According to an example embodiment, the Geographic Coordinates of a gNB can be given in for example decimal degrees (dd):

gNB1 location=Latitude/Longitude:57.011204°/ 9.993250°

Converting this to DMS format (Degrees (d), Arcminutes (m), Arcseconds (s)) we get for the latitude:

$$dd = 57.011204 \Rightarrow d = int(dd) = 57°$$

$$m = int((dd - d) \cdot 60) = 0.011204 * 60 = 0.67224 \Rightarrow 00'$$

$$s = \left(dd - d - \frac{m}{60}\right) * 3600 = 0.67224 * 60 = 40.3344 \Rightarrow 40.4''$$

so, position of gNB1=57°00'40.4"N 9°59'35.7"E

Two other reference positions have been chosen for two other gNBs, which may (in this illustrative example) mimic or simulate an outdoor mmWave scenario, as an illustrative example:

gNB2 @ reference position=57°00'48.5"N 9°59'20.0"E
gNB3 @ reference position=57°00'41.9"N 9°59'14.9"E The UE 210 includes three antenna arrays, including antenna array a1 to receive a beam from gNB1, antenna array a2 to receive a beam or signal from gNB2, and antenna array a3 to receive a signal or beam from gNB3.

A number of angles shown in FIGS. 5 and 6:

UE∡ b1⇒Relative beam direction at UE antenna array a1 (of gNB transmit beam for gNB1), calculated by UE=22.5°.

UE∡ b2⇒Relative beam direction at UE antenna array a2 (of gNB transmit beam for gNB2), calculated by UE=27.5°.

UE∡ b3⇒Relative beam direction at UE antenna array a3 (of gNB transmit beam for gNB3), calculated by UE=−10°.

UE∡ a1a2⇒Fixed angle between antenna array a1 & a2 at the UE

UE∡ a1a3⇒Fixed angle between antenna array a1 & a3 at the UE

UE∡ a2a3⇒Fixed angle between antenna array a2 & a3 at the UE

UE∡ b1b2⇒Angle between beam directions of array a1 & a2 calculated at the UE (angle between beam directions b1 and b2, calculated by UE)

UE∡ b1b3⇒Angle between beam direction of array a1 & a3 calculated at the UE (angle between beam directions b1 and b3, calculated by UE)

UE∡ b2b3⇒Angle between beam direction of array a2 & a3 calculated at the UE (angle between beam directions b2 and b3, calculated by UE)

Some additional angles shown:

UE∡ a1a2⇒Fixed angle between antenna array 1 & 2 at the UE

UE∡ a1a3⇒Fixed angle between antenna array 1 & 3 at the UE

UE∡ a2a3⇒Fixed angle between antenna array 2 & 3 at the UE

UE∡ b1⇒Relative beam direction at UE antenna array 1

UE∡ b2⇒Relative beam direction at UE antenna array 2

UE∡ b3⇒Relative beam direction at UE antenna array 3

Examples of UE 210 calculating UE-calculated angles:

$$UE∡b1b2 = UE∡a1a2 + UE∡b1 - UE∡b2 \Rightarrow 90° + 22.5° - (-27.5°) = 140.0°$$

$$UE∡b1b3 = UE∡a1a3 - UE∡b1 + UE∡b3 \Rightarrow 180° - 22.5° + (-10°) = 147.5°$$

$$UE∡b2b3 = UE∡a2a3 + UE∡b2 - UE∡b3 \Rightarrow 90° + (-27.5°) - (-10°) = 72.5°$$

These are illustrative examples of a calculation of UE-calculated angles, such as examples of angles 242A, 244A, 246A, shown in FIGS. 2-3.

According to an example embodiment, the relative position of the UE may be known, e.g., to convert the above calculated angles to the reference azimuth plane. The UE in this example is aligned with the azimuth plane and can be used directly.

Examples of LS (location server) 160 (or other network node or entity) calculating gNB-based (or network-based, or gNB calculated) angles:

The World Geodetic System (WGS84) is a standard used with satellite navigation (GNSS) and includes the definition of the coordinate system and derived constants according the ellipsoidal Earth Gravitational Model (EGM), used in Eqn. 1 and Eqn. 2.

1 degree [°], arcminute ['] and arcsecond ["] in latitude @ latitude 57°:

$$1° \text{ latitude} = 111132.92 - 559.82 * \cos(2 * \text{\textit{L}}lat) + \quad \text{(Eqn. 1)}$$

$$1.175 * \cos(4 * \text{\textit{L}}lat) - 0.0033 * \cos(6 * \text{\textit{L}}lat)$$

⇓

1° latitude @ 57°∡lat = 111.359 km

1' latitude @ 57°∡lat = 1.856 km

1" latitude @ 57°∡lat = 30.93 m 1 degree [°], arcminute ['] and arcsecond ["] longitude @ latitude 57°:

$$1° \text{ longitude} @ 57°∡lat = \quad \text{(Eqn. 2)}$$

$$111412.84 * \cos(\text{\textit{L}}lat) - 93.5 * \cos(3 * \text{\textit{L}}lat) + 0.118 * \cos(5 * \text{\textit{L}}lat)$$

⇓

1° longitude @ 57°∡lat = 60.129 km

1' longitude @ 57°∡lat = 1.002 km

1" longitude @ 57°∡lat = 16.7 m

The delta values in meters between the 3 gNBs are calculated as shown below and summarized in Table:

$\Delta longitude$ between $gNB1$ & $gNB2 =$ $$(60*lon' + lon'')@gNB1 - (60*lon' + lon'')@gNB2$$

$\Downarrow$ $\Delta longitude$ between $gNB1$ & $gNB2 =$ $$(60*59' + 35.7'') - (60*59' + 20.0'') = -15.7''$$

$\Downarrow$ $\Delta longitude$ between $gNB1$ & $gNB2 = -18.05'' * 16.7 = -262.2$ m

TABLE 1

Calculated latitude and longitude distances between the gNB's

| | Latitude | | | Longitude | | |
|---|---|---|---|---|---|---|
| | gNB1 | gNB2 | gNB3 | gNB1 | gNB2 | gNB3 |
| gNB1 | 0 | −252.1 m | −47.3 m | 0 | 262.2 m | 347.4 m |
| gNB2 | 252.1 m | 0 | 204.8 m | −26.2 m | 0 | 85.2 m |
| gNB3 | 47.3 m | −204.8 m | 0 | −347.4 m | −85.2 m | 0 |

The direct distances between the gNB are calculated by diagonal=$\sqrt{dis\_lat^2 + dis\_lon^2}$ and shown in Table.

TABLE 2

Direct distance between the gNB's

| Distance | gNB1→gNB2 | gNB1→gNB3 | gNB2→gNB3 |
|---|---|---|---|
| | 363.7 m | 350.6 m | 221.8 m |

Figure 7:
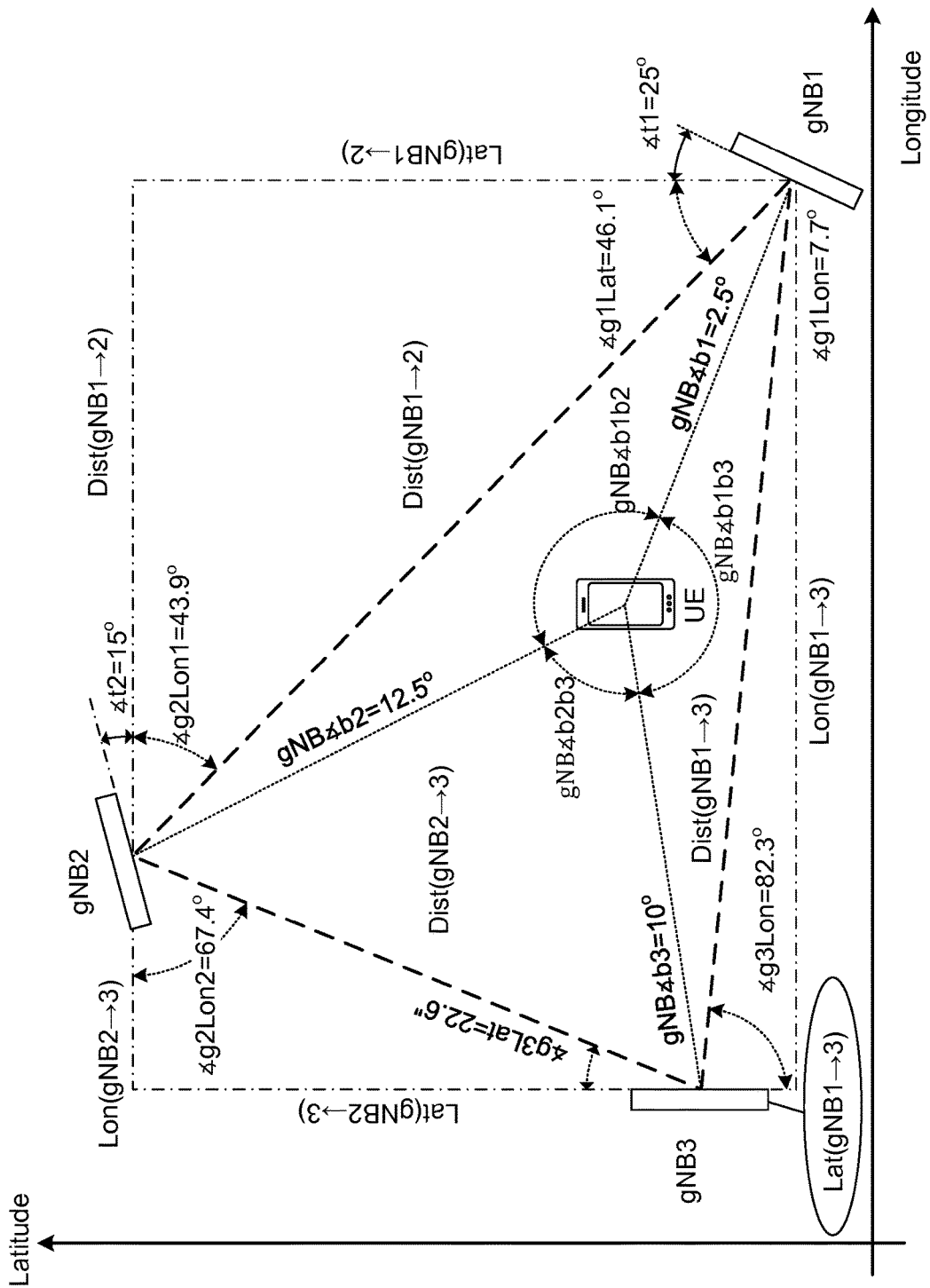
FIG. 7 is a diagram illustrating a LS calculation of gNB-based angles according to an example embodiment.

The calculated angles derived from the gNB position coordinates are shown in Table and FIG. 7 as ∡g1Lat.

TABLE 3

Calculated angles between the gNB's

| | ∡#1 | ∡#2 |
|---|---|---|
| gNB1→2 | ∡g1Lat1 = 46.1° | ∡g2Lon1 = 43.9° |
| gNB1→3 | ∡g1Lon = 7.70 | ∡g3Lat = 82.3° |
| gNB2→3 | ∡g2Lon2 = 67.4° | ∡g3Lat = 46.1° |

FIG. 7 is a diagram illustrating a LS calculation of gNB-based angles according to an example embodiment.

$gNB \measuredangle b1b2 =$ $180° - (90° - \measuredangle t1 - \measuredangle g1Lat - gNB \measuredangle b1) - (90° - \measuredangle t2 - \measuredangle g2Lon1 - gNB \measuredangle b2)$ $\Downarrow$ $gNB \measuredangle b1b2 = 180° - (90° - 25° - 46.1° + 2.5°) - (90° - 15° - 43.9° - 12.5°)$ $\Downarrow$ $gNB \measuredangle b1b2 = 140°$ The other 2 angles can be calculated as:

$gNB \measuredangle b1b3 =$ $180° - (90° - (90° - 25°) - 7.7° - 2.5°) - (90° - 0° - 82.3° + 10°) = 147.5°$ $gNB \measuredangle b2b3 =$ $180° - (90° + 15° - 67.4° + 12.5°) - (90° - 0° - 22.6° - 10°) = 72.5°$ These three LS calculated angles (gNB-based angles) are calculated from the gNB or LS 160 perspective. These three angles may be illustrative examples of gNB-based angles 242B, 244B and 246B (see FIG. 2).

Therefore, it can be seen that the UE-calculated angles (e.g., calculated in the examples of FIG. 6) match the gNB-based angles (e.g., calculated as shown with reference to FIG. 7). Thus, in this example, all three UE-gNB paths (UE-gNB1 path, UE-gNB2 path, and UE-gNB3 path) are LOS paths. Thus, LS 160 may forward or relay on signals or data obtained via all three of these LOS paths to determine or estimate the position of the UE 210.

Various angles may be described or defined according to the following:

gNB∡b1⇒Relative beam direction at the gNB1 antenna array (extracted by LS from CSI-RS Beam Info sent from serving gNB1)

gNB∡b2⇒Relative beam direction at the gNB2 antenna array (extracted by LS from SSB Beam Info sent from gNB2 to LS with UE selected SSB beam index provided by UE)

gNB∡b3⇒Relative beam direction at the gNB3 antenna array (extracted by LS from SSB Beam Info sent from gNB3 to LS with UE selected SSB beam index provided by UE)

∡t1⇒Fixed angle/tilt of gNB1 antenna array latitude reference in FIG. 7

∡t2⇒Fixed angle/tilt of gNB2 antenna array with longitude reference in FIG. 7

∡t3⇒Fixed angle/tilt of gNB3 antenna array=0 degrees in FIG. 7

Lon(gNB1→2)⇒Fixed longitude distance between gNB1 and gNB2 (obtained from gNB1/2 position data at LS)

Lat(gNB1→2)⇒Fixed latitude distance between gNB1 and gNB2 (obtained from gNB1/2 position data at LS)

Lon(gNB1→3)⇒Fixed longitude distance between gNB1 and gNB3 (obtained from gNB1/3 position data at LS)

Lat(gNB1→3)⇒Fixed latitude distance between gNB1 and gNB3 (obtained from gNB1/3 position data at LS)

Lon(gNB2→3)⇒Fixed longitude distance between gNB2 and gNB3 (obtained from gNB2/3 position data at LS)

Lat(gNB2→3)⇒Fixed latitude distance between gNB2 and gNB3 (obtained from gNB2/3 position data at LS)

Dist(gNB1→2)⇒Fixed direct distance between gNB1 and gNB2 (calculated by LS from above Lon/Lat distances)

Dist(gNB1→3)⇒Fixed direct distance between gNB1 and gNB3 (calculated by LS from above Lon/Lat distances)

Dist(gNB2→3)⇒Fixed direct distance between gNB2 and gNB3 (calculated by LS from above Lon/Lat distances)

∡g1Lat⇒Fixed angle between Dist(gNB1→2) and Lat (gNB1→2) (Calculated by LS)

∡g2Lon1⇒Fixed angle between Dist(gNB1→2) and Lon(gNB1→2) (Calculated by LS)

∡g3Lon⇒Fixed angle between Dist(gNB1→3) and Lat (gNB1→3) (Calculated by LS)

g1Lon⇒Fixed angle between Dist(gNB1→3) and Lon (gNB1→3) (Calculated by LS)

Figure 8:
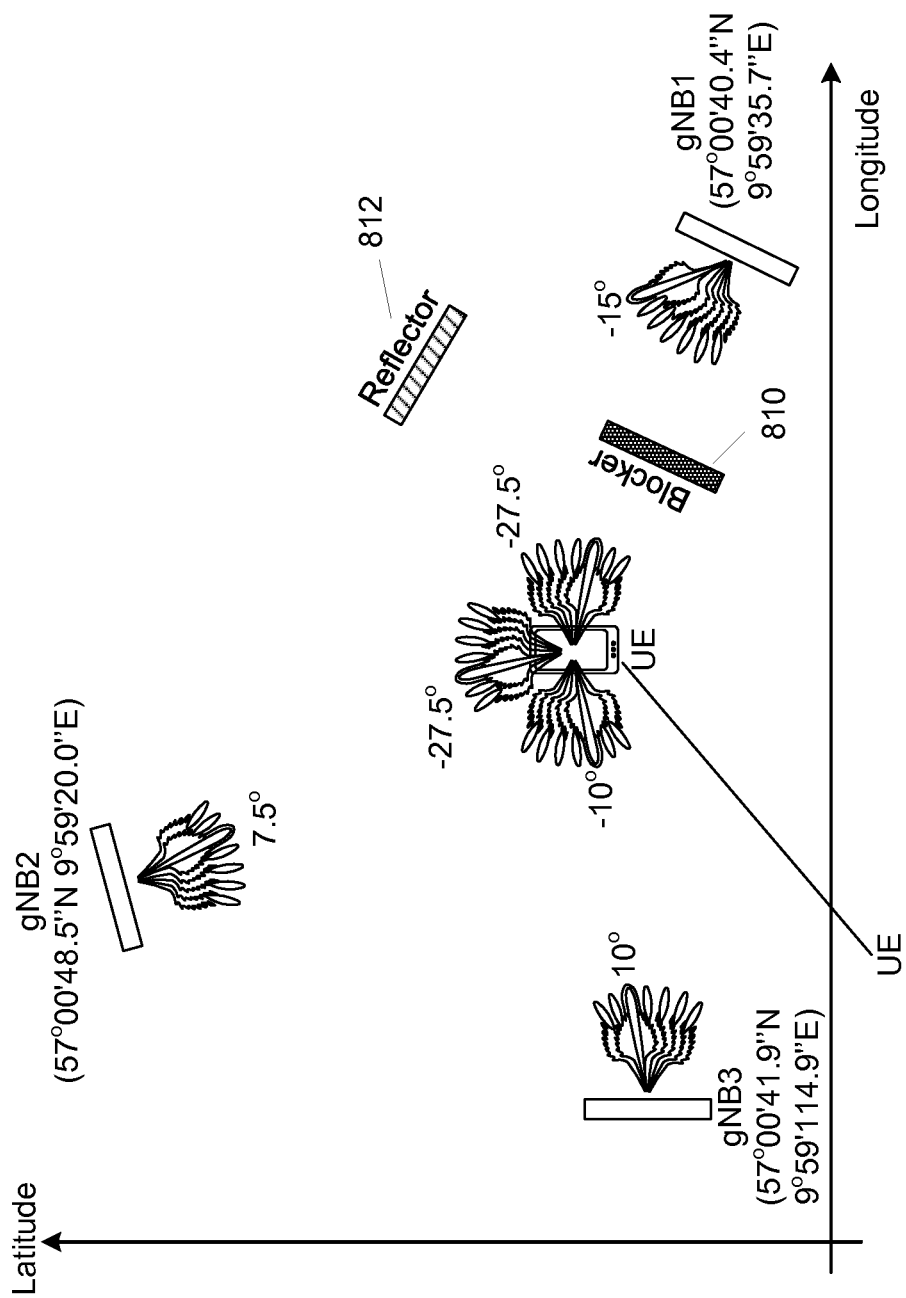
FIG. 8 is a diagram illustrating a 2 dimensional (2D) calculation example with three gNBs and 3 antenna arrays at the UE according to an example embodiment where at least one UE-gNB path is NLOS (non-line of sight).
Figure 9:
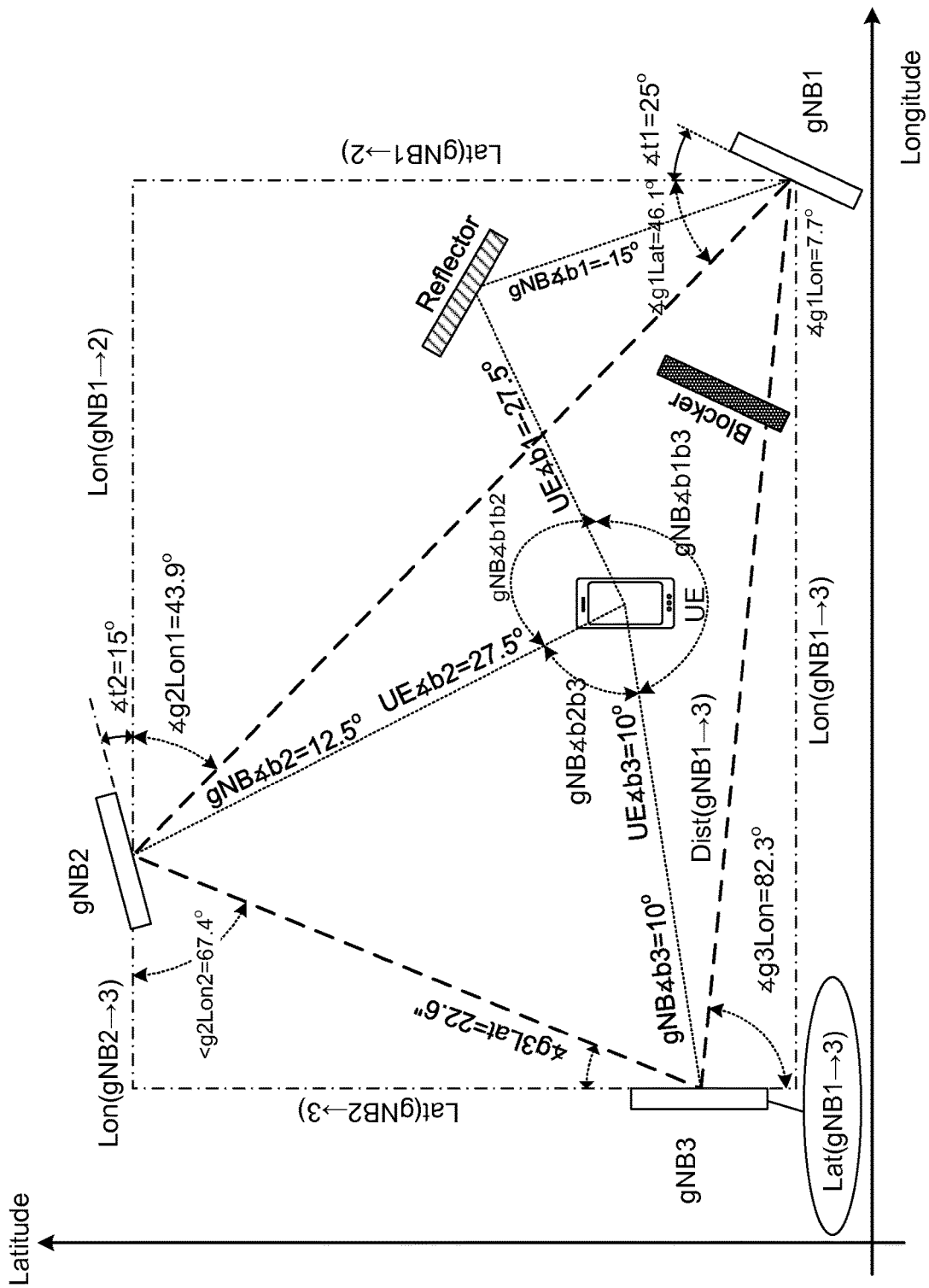
FIG. 9 is a diagram illustrating a UE and LS calculation of angles according to an example embodiment where at least one UE-gNB path is NLOS.

∡g3Lat⇒Fixed angle between Dist(gNB2→3) and Lat (gNB2→3) (Calculated by LS)

g2Lon2⇒Fixed angle between Dist(gNB2→3) and Lon (gNB2→3) (Calculated by LS)

gNB∡b1b2⇒Angle between beam direction of gNB 1 & 2 calculated at the gNB/LS gNB∡b1b3⇒Angle between beam direction of gNB 1 & 3 calculated at the gNB/LS gNB∡b2b3⇒Angle between beam direction of gNB 2 & 3 calculated at the gNB/LS FIG. 8 is a diagram illustrating a 2 dimensional (2D) calculation example with three gNBs and 3 antenna arrays at the UE according to an example embodiment where at least one UE-gNB path is NLOS (non-line of sight). FIG. 9 is a diagram illustrating a UE and LS calculation of angles according to an example embodiment where at least one UE-gNB path is NLOS. As shown in FIGS. 8-9, a blocker (or blocking object) 810 may block the direct path between UE 210 and gNB1. And, the signal from gNB1 to UE 210 may travel via a NLOS path via reflector 812. As a result, some of the UE-calculated angles with respect to gNB1 will not match some of the gNB-based (or LS or gNB calculated angles), due to the NLOS path between UE 210 and gNB1.

Some Angles calculated at the UE (UE-calculated angles):

$UE∡b1b2 =$ $UE∡a1a2 + UE∡b1 - UE∡b2 \Rightarrow 90° - (-27.5°) - (-27.5°) = 90.0°$ (note that the −27.5° angle is erroneous, causing the resulting 90° angle to be in error).

$UE∡b1b3 =$ $UE∡a1a3 - UE∡b1 + UE∡b3 \Rightarrow 180° - (-27.5°) + (-10°) = 197.5°$ (note that the −27.5° angle is erroneous here as well, causing the resulting 197.5° angle to be in error as well).

$UE∡b2b3 = UE∡a2a3 + UE∡b2 - UE∡b3 \Rightarrow 90° + (-27.5°) - (-10°) = 72.5$

Angles calculated at the gNB/or LS 160 (gNB-based angles):

$gNB∡b1b2 =$ $180° - (90° - 25° - 46.1° + (-15°)) - (90° - 15° - 43.9° - 12.5°) = 157.5°$ (note the −15° angle may be erroneous causing the resulting angle to be in error).

$gNB∡b1b3 = 180° -$ $(90° - (90° - 25°) - 7.7° - (-15°)) - (90° - 0° - 82.3° + 10°) = 130.0°$ (note the −15° angle may be erroneous causing the resulting angle to be in error).

$gNB∡b2b3 =$ $180° - (90° + 15° - 67.4° + 12.5°) - (90° - 0° - 22.6° - 10°) = 72.5°$

Since only the angle between gNB2 and gNB3 is equal when calculated at the UE and the LS 160, then signal path from gNB1 to UE 210 is NLOS and should not be relied upon for position calculation.

The procedure can be expanded to a 3D (3-dimensional) environment by adding the elevation details, like height of the gNBs and the UE, together with the direction of the beams in elevation.

Figure 10:
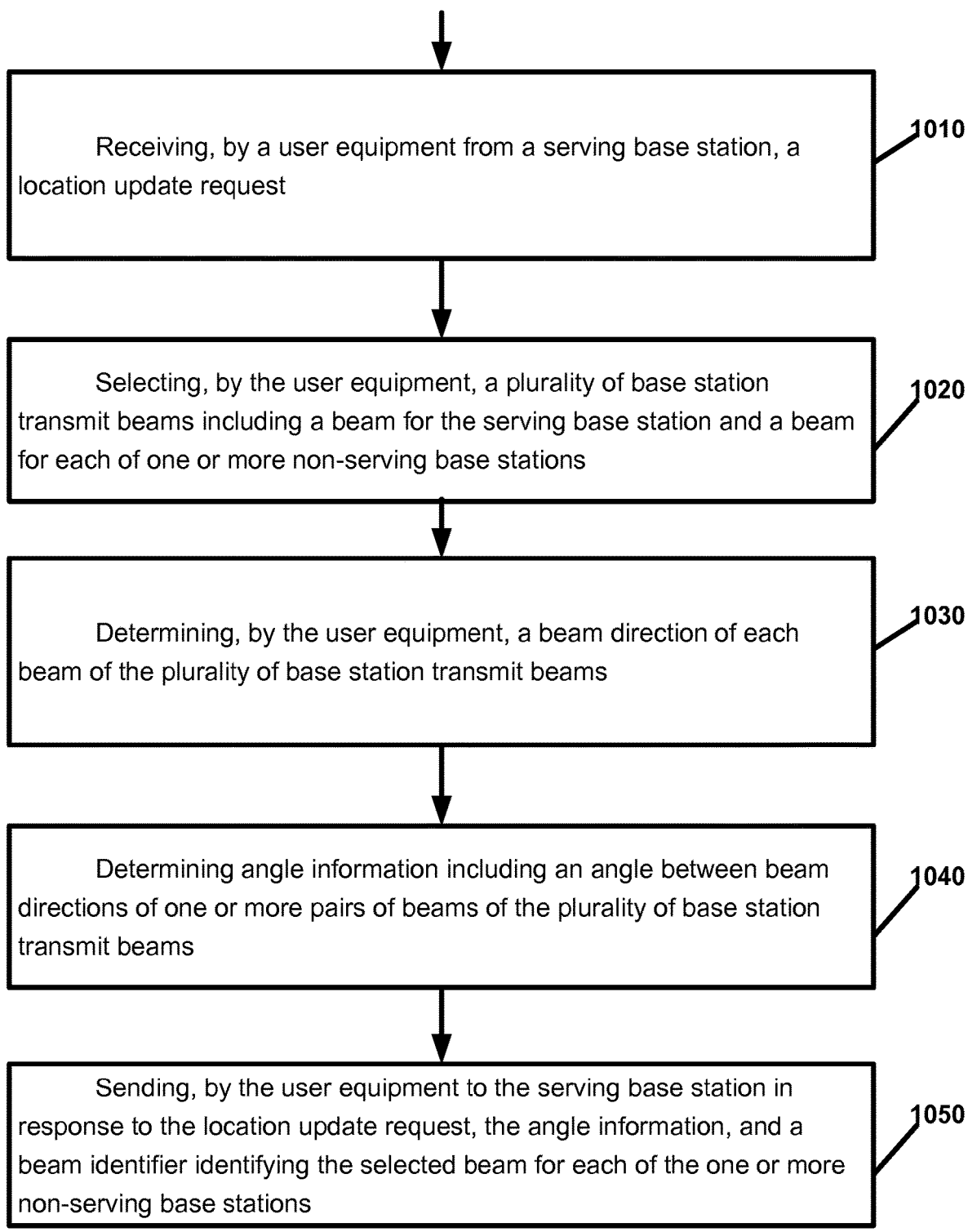
FIG. 10 is a flow chart illustrating operation of a user equipment according to an example embodiment.

Example 1. FIG. 10 is a flow chart illustrating operation of a user equipment according to an example embodiment. Operation 1010 includes receiving, by a user equipment from a serving base station, a location update request. Operation 1020 includes selecting, by the user equipment, a plurality of base station transmit beams including a beam for the serving base station and a beam for each of one or more non-serving base stations. Operation 1030 includes determining, by the user equipment, a beam direction of each beam of the plurality of base station transmit beams. Operation 1040 includes determining angle information including an angle between beam directions of one or more pairs of beams of the plurality of base station transmit beams. And, operation 1050 includes sending, by the user equipment to the serving base station in response to the location update request, the angle information, and a beam identifier or time stamp identifying the selected beam for each of the one or more non-serving base stations.

Example 2. The method of example 1, wherein: the selected beam for the serving base station comprises a channel state information-reference signal (CSI-RS) beam that is received by the user equipment from the serving base station; and the beam for each of one or more non-serving base stations comprises a synchronization signal block (SSB) beam received by the user equipment from each of the one or more non-serving base stations.

Example 3. The method of any of examples 1-2 wherein the determining a beam direction comprises: determining, by the user equipment, a beam direction of one or more of the selected beams using a direction of arrival (DOA) technique.

Example 4. The method of any of examples 1-3 wherein the selecting comprises performing the following for each of the one or more non-serving base stations: receiving, by the user equipment from the non-serving base station, a plurality of synchronization signal blocks (SSBs), each synchronization signal block (SSB) received via an associated synchronization signal block (SSB) beam; and selecting, by the user equipment, one or more of the synchronization signal block (SSB) beams from the non-serving base station having a highest received power.

Example 5. The method of any of examples 1-4, wherein: the selected beam for the serving base station comprises a channel state information-reference signal (CSI-RS) beam that is used for communication between the user equipment and the serving base station for the user equipment; and the selected beam for each of one or more non-serving base stations comprises a first synchronization signal block (SSB) beam for a first non-serving base station and a second synchronization signal block (SSB) beam for a second non-serving base station; and wherein the determining a beam direction of each beam of the plurality of beams comprises: determining a beam direction of the channel state information-reference signal (CSI-RS) beam; determining a beam direction of the first synchronization signal block (SSB) beam for the first non-serving base station; and determining a beam direction of the second synchronization signal block (SSB) beam for the second non-serving base station.

Example 6. The method of example 5, wherein the determining the angle information comprises: determining a first angle between the beam direction of the channel state information-reference signal (CSI-RS) beam and the beam direction of the first synchronization signal block (SSB) beam for the first non-serving base station; determining a second angle between the beam direction of the channel state information-reference signal (CSI-RS) beam and the beam direction of the second synchronization signal block (SSB) beam for the second non-serving base station; and determining a third angle between the beam direction of the first synchronization signal block (SSB) beam for the first non-serving base station and the second synchronization signal block (SSB) beam for the second non-serving base station.

Example 7. An apparatus comprising means for performing the method of any of examples 1-6.

Example 8. A non-transitory computer-readable storage medium comprising instructions stored thereon that, when executed by at least one processor, are configured to cause a computing system to perform the method of any of examples 1-6.

Example 9. An apparatus comprising: at least one processor; and at least one memory including computer program code; the at least one memory and the computer program code configured to, with the at least one processor, cause the apparatus at least to perform the method of any of examples 1-6.

Figure 11:
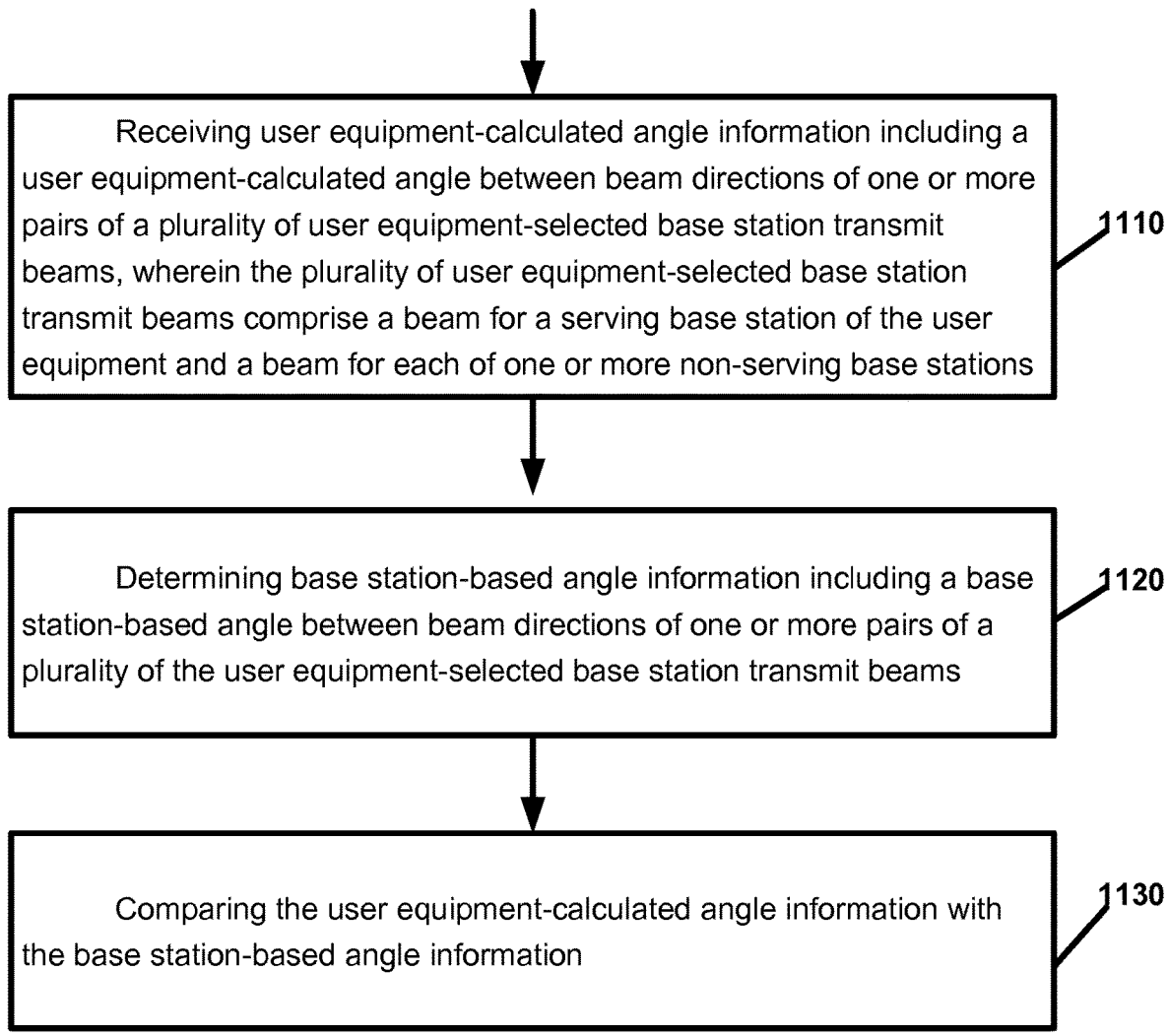
FIG. 11 is a flow chart illustrating operation of according to another example embodiment.

Example 10. FIG. 11 is a flow chart illustrating operation of according to another example embodiment. Operation 1110 includes receiving user equipment-calculated angle information including a user equipment-calculated angle between beam directions of one or more pairs of a plurality of user equipment-selected base station transmit beams, wherein the plurality of user equipment-selected base station transmit beams comprise a beam for a serving base station of the user equipment and a beam for each of one or more non-serving base stations. Operation 1120 includes determining base station-based angle information including a base station-based angle between beam directions of one or more pairs of a plurality of the user equipment-selected base station transmit beams. And, operation 1130 includes comparing the user equipment-calculated angle information with the base station-based angle information.

Example 11. The method of example 10, further comprising: receiving a plurality of beam identifiers including a beam identifier identifying each beam of the plurality of user equipment-selected base station transmit beams; determining a beam direction associated with each of a plurality of beam identifiers; and determining, based on the plurality of beam identifiers of the user equipment-selected base station transmit beams, a beam direction for each of the user equipment-selected base station transmit beams; wherein the determining base station-based angle information comprises: determining, based on the beam direction for each of the user equipment-selected base station transmit beams, base station-based angle information including a base station-based angle between beam directions of one or more pairs of a plurality of the user equipment-selected base station transmit beams.

Example 12. The method of any of examples 10-11, further comprising: receiving, from one or more of the base stations, an estimate of the beam direction towards the user equipment, based on a direction of arrival (DOA) technique performed by the one or more base stations; and wherein the determining base station-based angle information comprises: determining, based on the estimate of the beam direction towards the user equipment, base station-based angle information including a base station-based angle between beam directions of one or more pairs of a plurality of directions towards the user equipment.

Example 13. The method of any of examples 10-12, further comprising: determining a position of the user equipment based, at least in part, on the comparing.

Example 14. The method of example 13, wherein the determining a position of the user equipment comprises: determining, based on the comparing, that a communication path between the user equipment and at least one of the base stations is a non-line-of-sight path; and determining, based on the comparing, that one or more further communication paths between the user equipment and at least one of the base stations is a line-of-sight path(s); determining a position of the user equipment based on the one or more line-of-sight paths, while disregarding or not using the non-line-of-sight path.

Example 15. The method of example 14 wherein a match or correlation, within a threshold amount, of corresponding angles of the user equipment-calculated angle information and the base station-based angle information indicates that all communication paths between the user equipment and each of the serving base station and the one or more non-serving base stations are line-of-sight paths and may be relied upon for determining a location of the user equipment.

Example 16. The method of any of examples 10-15, further comprising: determining a location of the serving base station and a location of each of the one or more non-serving base stations; determining an angle of orientation of a base station antenna array for each of the base stations; wherein the determining base station-based angle information comprises determining, based on the plurality of beam identifiers, the location of the serving base station, the location of each of the one or more non-serving base stations and the orientation of the base station antenna arrays, base station-based angle information including a base station-based angle between beam directions of one or more pairs of the plurality of the user equipment-selected base station transmit beams.

Example 17. The method of any of examples 14-16 wherein the determining, based on the comparing, that a communication path between the user equipment and at least one of the base stations is a non-line of sight path comprises determining at least one of the following: that a first angle between a beam direction of a channel state information-reference signal (CSI-RS) beam of the serving base station and a beam direction of the first synchronization signal block (SSB) beam for a first non-serving base station of the user equipment-calculated angle information does not match, within a threshold value, a corresponding angle of the base station-based angle information; that a second angle between the beam direction of the channel state information-reference signal (CSI-RS) beam of the serving base station and a beam direction of a second synchronization signal block (SSB) beam for a second non-serving base station of the user equipment-calculated angle information does not match, within a threshold value, a corresponding angle of the base station-based angle information; and that a third angle between the beam direction of the first synchronization signal block (SSB) beam for the first non-serving base station and the second synchronization signal block (SSB) beam for the second non-serving base station of the user equipment-calculated angle information does not match, within a threshold value, a corresponding angle of the base station-based angle information.

Example 18. The method of any of examples 10-17 wherein each of the beam identifiers comprises at least one of: a beam index associated with or identifying a beam; or a time stamp identifying a time when the user equipment received a beam.

Example 19. An apparatus comprising means for performing the method of any of examples 10-18.

Example 20. A non-transitory computer-readable storage medium comprising instructions stored thereon that, when executed by at least one processor, are configured to cause a computing system to perform the method of any of examples 10-18.

Example 21. An apparatus comprising: at least one processor; and at least one memory including computer program code; the at least one memory and the computer program code configured to, with the at least one processor, cause the apparatus at least to perform the method of any of examples 10-18.

Figure 12:
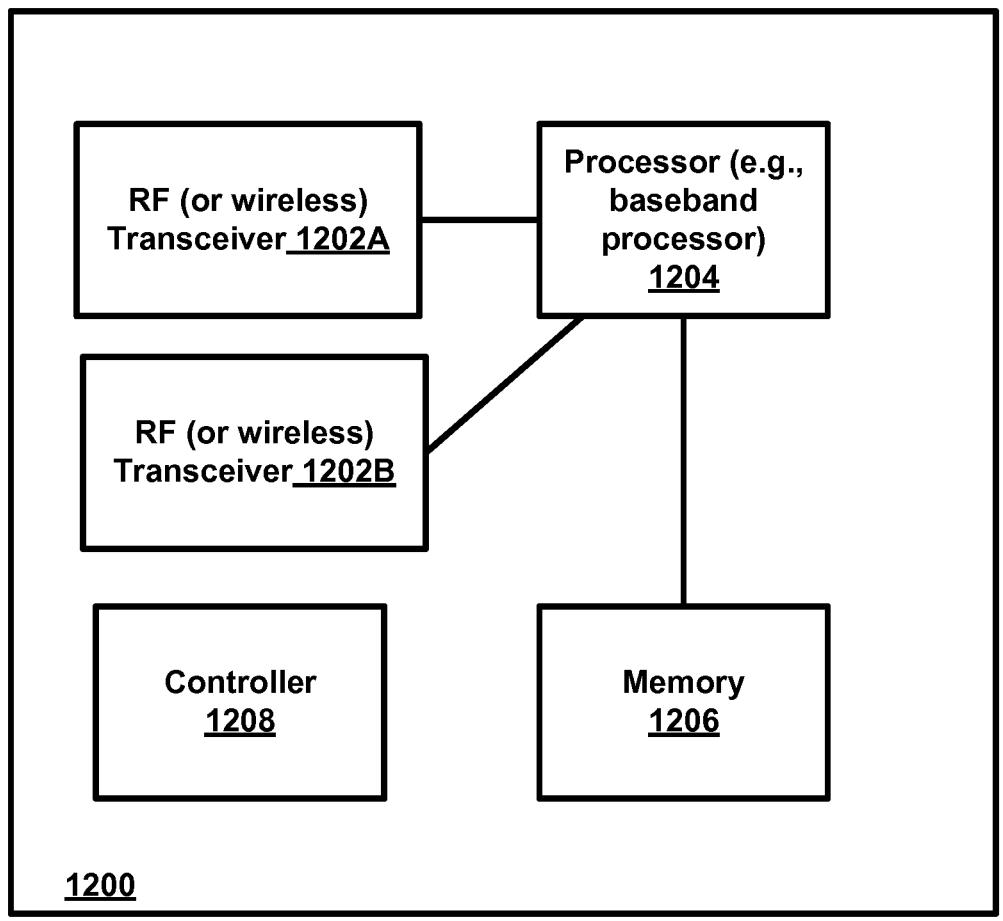
FIG. 12 is a block diagram of a wireless station (e.g., AP, BS, RAN node, UE or user device, or other network node) according to an example embodiment.

FIG. 12 is a block diagram of a wireless station (e.g., AP, BS or user device/UE, or another network node) 1200 according to an example embodiment. The wireless station 1200 may include, for example, one or more (e.g., two as shown in FIG. 12) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 12, a controller (or processor) 1208 may execute software and instructions, and may provide overall control for the station 1200, and may provide control for other systems not shown in FIG. 12, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
receiving user equipment-calculated angle information including a user equipment-calculated angle between beam directions of one or more pairs of a plurality of user equipment-selected base station transmit beams,
wherein the plurality of user equipment-selected base station transmit beams comprise a beam for a serving base station of a user equipment and a beam for each of one or more non-serving base stations;
determining base station-based angle information including a base station-based angle between beam directions of one or more pairs of the plurality of the user equipment-selected base station transmit beams;
comparing the user equipment-calculated angle information with the base station-based angle information;
determining a location of the serving base station and a location of the one or more non-serving base stations; and
determining an angle of orientation of a base station antenna array for the base stations;
wherein the determining base station-based angle information comprises determining, based on a plurality of received beam identifiers, the location of the serving base station, the location of the one or more non-serving base stations and the angle of orientation of the base station antenna array, the base station-based angle information to comprise at least a base station-based angle between beam directions of one or more pairs of the plurality of the user equipment-selected base station transmit beams.

2. The method of claim 1, further comprising:
receiving a plurality of beam identifiers including a beam identifier identifying each beam of the plurality of user equipment-selected base station transmit beams;
determining a beam direction associated with each of a plurality of beam identifiers; and
determining, based on the plurality of beam identifiers of the user equipment-selected base station transmit beams, a beam direction for each of the user equipment-selected base station transmit beams;

wherein the determining base station-based angle information comprises:

determining, based on the beam direction for each of the user equipment-selected base station transmit beams, base station-based angle information including a base station-based angle between beam directions of one or more pairs of a plurality of the user equipment-selected base station transmit beams.

3. The method of claim 1, further comprising:

receiving, from one or more of the base stations, an estimate of the beam direction towards the user equipment, based on a direction of arrival technique performed by the one or more base stations; and wherein the determining base station-based angle information comprises:

determining, based on the estimate of the beam direction towards the user equipment, base station-based angle information including a base station-based angle between beam directions of one or more pairs of the plurality of directions towards the user equipment.

4. The method of claim 1, further comprising:

determining a position of the user equipment based, at least in part, on the comparing.

5. The method of claim 4, wherein the determining a position of the user equipment comprises:

determining, based on the comparing, that a communication path between the user equipment and at least one of the base stations is a non-line-of-sight path;

determining, based on the comparing, that one or more further communication paths between the user equipment and at least one of the base stations is a line-of-sight path; and determining a position of the user equipment based on the one or more line-of-sight paths, while disregarding or not using the non-line-of-sight path.

6. The method of claim 5 wherein a match or correlation, within a threshold amount, of corresponding angles of the user equipment-calculated angle information and the base station-based angle information indicates that all communication paths between the user equipment and each of the serving base station and the one or more non-serving base stations are line-of-sight paths and relied upon for determining a location of the user equipment.

7. The method of claim 5 wherein the determining, based on the comparing, that a communication path between the user equipment and at least one of the base stations is a non-line-of-sight path comprises determining at least one of the following:

that a first angle between a beam direction of a channel state information-reference signal beam of the serving base station and a beam direction of a first synchronization signal block beam for a first non-serving base station of the user equipment-calculated angle information does not match, within a threshold value, a corresponding angle of the base station-based angle information;

that a second angle between the beam direction of the channel state information-reference signal beam of the serving base station and a beam direction of a second synchronization signal block beam for a second non-serving base station of the user equipment-calculated angle information does not match, within a threshold value, a corresponding angle of the base station-based angle information; or that a third angle between the beam direction of the first synchronization signal block beam for the first non-serving base station and the second synchronization signal block beam for the second non-serving base station of the user equipment-calculated angle information does not match, within a threshold value, a corresponding angle of the base station-based angle information.

8. The method of claim 7, further comprising receiving a plurality of beam identifiers including a beam identifier identifying beams of the plurality of user equipment-selected base station transmit beams, wherein each of the beam identifiers comprises at least one of:

a beam index associated with or identifying a beam; or a time stamp identifying a time when the user equipment received a beam.

9. An apparatus comprising:

at least one processor; and at least one non-transitory memory storing instructions that, when executed by the at least one processor, cause the apparatus at least to perform;

receiving user equipment-calculated angle information including a user equipment-calculated angle between beam directions of one or more pairs of a plurality of user equipment-selected base station transmit beams, wherein the plurality of user equipment-selected base station transmit beams comprise a beam for a serving base station of a user equipment and a beam for each of one or more non-serving base stations;

determining base station-based angle information including a base station-based angle between beam directions of one or more pairs of the plurality of the user equipment-selected base station transmit beams;

comparing the user equipment-calculated angle information with the base station-based angle information:

determining a location of the serving base station and a location of the one or more non-serving base stations; and determining an angle of orientation of a base station antenna array for the base stations;

wherein the determining base station-based angle information comprises determining, based on a plurality of received beam identifiers, the location of the serving base station, the location of the one or more non-serving base stations and the angle of orientation of the base station antenna array, the base station-based angle information to comprise at least a base station-based angle between beam directions of one or more pairs of the plurality of the user equipment-selected base station transmit beams.

10. A non-transitory computer readable medium comprising program instructions stored thereon for performing:

receiving user equipment-calculated angle information including a user equipment-calculated angle between beam directions of one or more pairs of a plurality of user equipment-selected base station transmit beams, comprise a beam for a serving base station of a user equipment and a beam for each of one or more non-serving base stations;

determining base station-based angle information including a base station-based angle between beam directions of one or more pairs of the plurality of the user equipment-selected base station transmit beams;

comparing the user equipment-calculated angle information with the base station-based angle information:

determining a location of the serving base station and a location of the one or more non-serving base stations; and determining an angle of orientation of a base station antenna array for the base stations;

wherein the determining base station-based angle information comprises determining, based on a plurality of received beam identifiers, the location of the serving base station, the location of the one or more non-serving base stations and the angle of orientation of the base station antenna array, the base station-based angle information to comprise at least a base station-based angle between beam directions of one or more pairs of the plurality of the user equipment-selected base station transmit beams.

* * * * *